(12) United States Patent
Hiemstra et al.

(10) Patent No.: US 12,205,399 B2
(45) Date of Patent: Jan. 21, 2025

(54) GEOMETRIC STRUCTURES FOR ACOUSTIC IMPEDANCE MATCHING AND IMPROVED TOUCH SENSING AND FINGERPRINT IMAGING

(71) Applicant: Apple Inc., Cupertino, CA (US)

(72) Inventors: Daniel J. Hiemstra, San Francisco, CA (US); George Ho Yin Mak, Fremont, CA (US); Ehsan Khajeh, Los Gatos, CA (US); Hoishun Li, Sunnyvale, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 18/331,867

(22) Filed: Jun. 8, 2023

(65) Prior Publication Data

US 2023/0351797 A1    Nov. 2, 2023

Related U.S. Application Data

(63) Continuation of application No. 17/660,308, filed on Apr. 22, 2022, now Pat. No. 11,715,321.

(Continued)

(51) Int. Cl.
*G06V 40/13* (2022.01)
*G06F 3/041* (2006.01)
(Continued)

(52) U.S. Cl.
CPC ........ *G06V 40/1306* (2022.01); *G06F 3/0412* (2013.01); *G06F 3/0436* (2013.01); *G10K 11/02* (2013.01)

(58) Field of Classification Search
CPC ............ G06V 40/1306; G06V 40/1365; G06F 3/0412; G06F 3/0436; G06F 3/0433;
(Continued)

(56) References Cited

U.S. PATENT DOCUMENTS

| 7,750,536 B2 | 7/2010 | Chaggares et al. |
| 7,808,156 B2 | 10/2010 | Chaggares et al. |

(Continued)

FOREIGN PATENT DOCUMENTS

| CN | 109535650 A | 3/2019 |
| KR | 20200010863 A | 1/2020 |

(Continued)

OTHER PUBLICATIONS

Toda IEEE Transactions on Ultrasonics, Ferroelectrics, and Frequency Control, vol. 49, No. 7, Jul. 2002 (Year: 2002).*

(Continued)

*Primary Examiner* — Jonathan A Boyd
(74) *Attorney, Agent, or Firm* — Kubota & Basol LLP

(57) ABSTRACT

Improving the accuracy of ultrasonic touch sensing and fingerprint imaging using acoustic impedance matching is disclosed. Acoustic impedance mismatches between an ultrasonic transducer array and a sensing plate can be reduced to maximize energy transfer and minimize parasitic reflections. A reduction in acoustic impedance mismatches can be accomplished using (i) a composite epoxy having a higher acoustic impedance than epoxy alone, (ii) one or more matching layers having an acoustic impedance that is approximately the geometric mean of the acoustic impedance of the sensing plate and the acoustic impedance of the transducer array, (iii) pores or perforations in the sensing plate, or (iv) geometric structures formed in the sensing plate. In addition, parasitic reflections can be suppressed using an absorbent layer.

19 Claims, 13 Drawing Sheets

Related U.S. Application Data

(60) Provisional application No. 63/188,108, filed on May 13, 2021, provisional application No. 63/188,123, filed on May 13, 2021, provisional application No. 63/188,114, filed on May 13, 2021.

(51) Int. Cl.
*G06F 3/043* (2006.01)
*G10K 11/02* (2006.01)

(58) Field of Classification Search
CPC ........ G10K 11/02; G01B 17/00; G01H 15/00; H03H 9/2405
See application file for complete search history.

(56) References Cited

U.S. PATENT DOCUMENTS

| | | | |
|---|---|---|---|
| 11,715,321 | B2 | 8/2023 | Hiemstra et al. |
| 2003/0029010 | A1 | 2/2003 | Aime |
| 2011/0050039 | A1 | 3/2011 | Toda et al. |
| 2015/0241393 | A1* | 8/2015 | Ganti ............... G01N 29/09 73/589 |
| 2016/0022244 | A1 | 1/2016 | Courtney et al. |
| 2018/0243794 | A1 | 8/2018 | Buckland |
| 2018/0268187 | A1 | 9/2018 | Jeong et al. |
| 2019/0354210 | A1* | 11/2019 | Akhbari ............ G06F 3/0416 |
| 2020/0050816 | A1* | 2/2020 | Tsai ..................... B06B 1/06 |
| 2020/0155119 | A1 | 5/2020 | Abothu et al. |
| 2020/0170620 | A1 | 6/2020 | Bruestle |
| 2020/0337677 | A1 | 10/2020 | Saito et al. |
| 2020/0410070 | A1 | 12/2020 | Strohmann |
| 2021/0149510 | A1 | 5/2021 | Zhang et al. |
| 2022/0366719 | A1 | 11/2022 | Hiemstra et al. |

FOREIGN PATENT DOCUMENTS

| | | |
|---|---|---|
| KR | 10-2021-0011211 A | 2/2021 |
| WO | 2020/052455 A1 | 3/2020 |
| WO | 2020/102965 A1 | 5/2020 |
| WO | 2020/253590 A1 | 12/2020 |

OTHER PUBLICATIONS

Extended European Search Report received for European Patent Application No. 22171177.3, mailed on Oct. 4, 2022, 9 pages.
Extended European Search Report received for European Patent Application No. 22171238.3, mailed on Oct. 5, 2022, 8 pages.
Extended European Search Report received for European Patent Application No. 22171965.1, mailed on Oct. 6, 2022, 8 pages.
Non-Final Office Action received for U.S. Appl. No. 17/660,308, mailed on Aug. 31, 2022, 11 pages.
Notice of Allowance received for U.S. Appl. No. 17/660,308, mailed on Mar. 8, 2023, 7 pages.

* cited by examiner

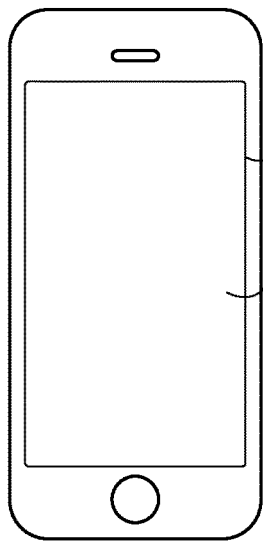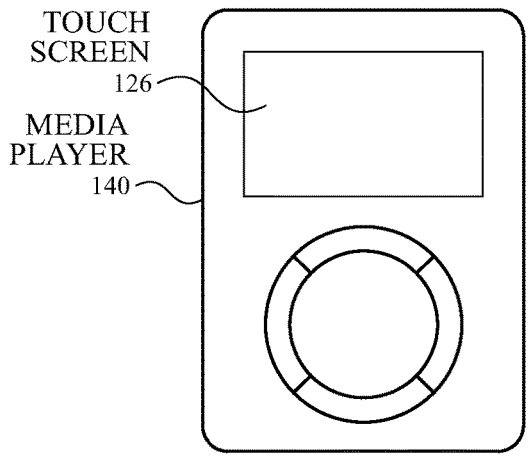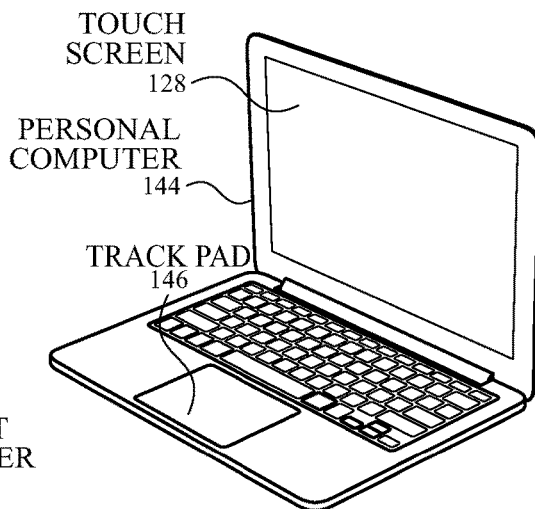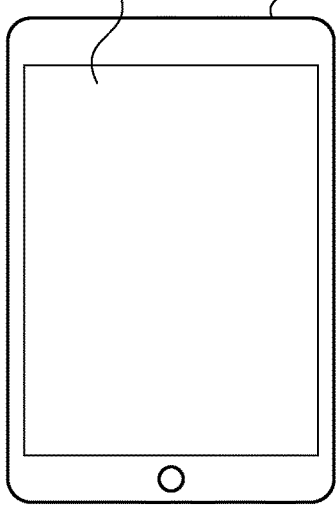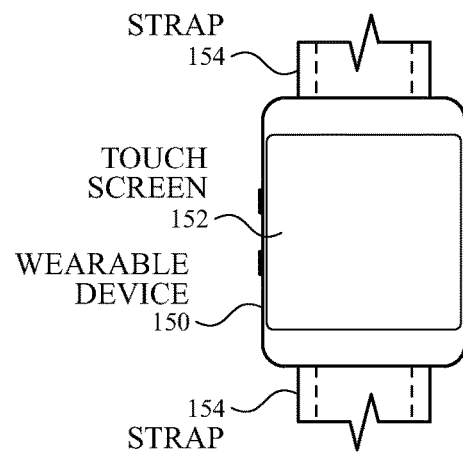
FIG. 1A
FIG. 1B
FIG. 1C
FIG. 1D
FIG. 1E

GEOMETRIC STRUCTURES FOR ACOUSTIC IMPEDANCE MATCHING AND IMPROVED TOUCH SENSING AND FINGERPRINT IMAGING

CROSS-REFERENCE TO RELATED APPLICATIONS

This application is a continuation of U.S. patent application Ser. No. 17/660,308, filed Apr. 22, 2022, now U.S. Publication No. US-2022-0366719-A1, which claims the benefit of U.S. Provisional Application No. 63/188,108, filed May 13, 2021, U.S. Provisional Application No. 63/188,114, filed May 13, 2021, and U.S. Provisional Application No. 63/188,123, filed May 13, 2021, which are hereby incorporated by reference in their entireties for all purposes.

FIELD OF THE DISCLOSURE

This relates generally to ultrasonic touch sensing and fingerprint imaging systems, and more particularly, to acoustic impedance matching for improved ultrasonic touch sensing and fingerprint imaging.

BACKGROUND OF THE DISCLOSURE

Many types of electronic devices are presently available that are capable of receiving touch input to initiate operations. Examples of such devices include desktop, laptop and tablet computing devices, smartphones, media players, wearables such as watches and health monitoring devices, smart home control and entertainment devices, headphones and earbuds, and devices for computer-generated environments such as augmented reality, mixed reality, or virtual reality environments. Many of these devices can receive input through the physical touching of buttons or keys, mice, trackballs, joysticks, touch panels, touch screens and the like. Wearable devices, in particular, can provide users with immediately accessible mechanisms for performing various functions, and in some instances quick access to sensitive user information either alone, or through paired devices. However, the potential for easy access to device functions and/or sensitive information creates a need for secure authentication and access.

To provide secure authentication, fingerprint detection can be implemented on a surface such as the button of a watch. Because the surface may be fabricated from metal and/or may be of a certain thickness (e.g., greater than 300 microns) that can render other sensing technologies impractical, ultrasonic touch sensing can be employed to perform fingerprint imaging. In some examples, an array of piezoelectric micro-machined ultrasonic transducers (PMUTs) can be used to propagate ultrasonic waves through touch surfaces of various materials and thicknesses, where the presence or absence of fingerprint ridges can alter the amount of energy reflected back to the PMUT array. These changes in reflected energy can be used to determine an image of the fingerprint of a user. However, when the PMUT array and associated electronics are affixed to the back of the touch surface, the resulting stackup of materials (e.g., PMUT array, bonding material, sensing plate, etc.) can create acoustic impedance mismatches that can reduce the transmission of ultrasonic energy to/from the PMUT array and the touch surface, and can also create parasitic reflections, both of which can adversely affect the ability of the PMUT array to accurately perform fingerprint imaging.

SUMMARY

Examples of the disclosure are generally directed to providing ultrasonic touch sensing and fingerprint imaging capability, and in particular to acoustic impedance matching for improved ultrasonic touch sensing and fingerprint imaging. In some examples of the disclosure, an epoxy with a relatively low acoustic impedance can be combined with a filler material to increase the overall acoustic impedance of the resulting composite epoxy. The composite epoxy can be used to adhere an ultrasonic transducer array to a top layer (i.e., sensing plate or cap layer) configured to receive a touch (e.g., from a finger). The composite epoxy (with filler material) can have an acoustic impedance that is higher than the acoustic impedance of the epoxy alone, and can more closely match the acoustic impedance of the transducer array. The acoustic impedance of the composite epoxy can reduce the impedance mismatch between the transducer array and the sensing plate, which can result in reduced attenuation of the ultrasonic waves, fewer reflections, and more accurate touch sensing and fingerprint imaging.

In some examples of the disclosure, one or more matching layers having a total acoustic impedance approximately equal to the geometric mean of the acoustic impedance of the sensing plate and the acoustic impedance of the transducer array can be formed on, or affixed to, the sensing plate. In some examples, each of the one or matching layers can be formed from one or more metals. The one or more matching layers (and the attached sensing plate) can then be adhered to the transducer array using an epoxy or the composite epoxy described above. Each of the one or more matching layers can have a thickness approximately equal to a quarter-wavelength of the ultrasonic waves propagating through that matching layer. The one or more matching layers can create an acoustic impedance gradient between the transducer array and the sensing plate to reduce the acoustic impedance mismatch between the transducer array and the sensing plate, which can result in reduced attenuation of the ultrasonic waves, fewer reflections, and more accurate touch sensing and fingerprint imaging.

In some examples of the disclosure, the sensing plate can be fabricated with a nonuniform distribution of pores (e.g., holes), or perforations along one or more surfaces of the sensing plate, to create one or more acoustic impedance gradients within the sensing plate. The one or more acoustic impedance gradients can result in reduced attenuation of the ultrasonic waves, fewer reflections, higher signal-to-noise ratio (SNR) touch signals (leading to higher contrast touch and fingerprint images), and ultimately more accurate touch sensing and fingerprint imaging.

In some examples of the disclosure, geometric structures (e.g., cones) can be formed on the back of the sensing plate. The geometric structures can have a peak-to-peak spacing that is much less than the wavelength of the ultrasonic waves propagating through the sensing plate, and can have a peak-to-valley height that is at least three times the wavelength of the ultrasonic waves. A lower acoustic impedance material can fill the gaps between the geometric structure to produce an acoustic impedance gradient at the location of the geometric structures and the filler material. This acoustic impedance gradient can result in reduced attenuation of the ultrasonic waves, fewer reflections, and more accurate touch sensing and fingerprint imaging.

In some examples of the disclosure, because the transducer array can also generate undesired ultrasonic waves in a direction away from the sensing plate and through any underlying electronics, an absorbent layer can be formed on the back side of the ultrasonic sensing electronics to absorb the undesired ultrasonic waves and reduce the reflections of those waves. The absorbent layer can be a composite epoxy formed from Tungsten fillers and an epoxy. This absorbent layer can have an acoustic impedance that is higher than conventional epoxies, with high ultrasonic wave absorption. The absorbent layer can reduce the energy of reflections from the undesired ultrasonic waves, which can result in attenuation of undesirable/parasitic ultrasonic waves, fewer reflections, and more accurate touch sensing and fingerprint imaging.

BRIEF DESCRIPTION OF THE DRAWINGS

FIGS. 1A-1G illustrate systems that can employ ultrasonic touch sensing and fingerprint imaging with acoustic impedance matching according to examples of the disclosure.

DETAILED DESCRIPTION

Figure 1F:
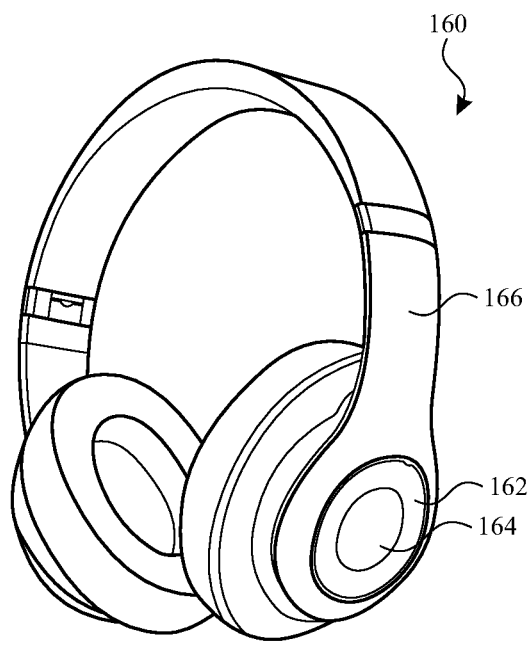

In the following description of various examples, reference is made to the accompanying drawings which form a part hereof, and in which it is shown by way of illustration specific examples that can be practiced. It is to be understood that other examples can be used and structural changes can be made without departing from the scope of the various examples.

Ultrasonic touch sensing and fingerprint imaging systems can be adversely affected by acoustic impedance mismatches as ultrasonic waves travel to a touch surface such as a sensing plate. These mismatches can cause undesired reflections of the ultrasonic waves, in addition to a reduction in the energy of the ultrasonic waves that eventually reach the sensing plate and are reflected back with different amplitudes depending on whether an object (e.g., a fingerprint ridge) is touching the sensing plate.

Accordingly, examples of the disclosure are generally directed to providing ultrasonic touch sensing and fingerprint imaging capability, and in particular to acoustic impedance matching for improved ultrasonic touch sensing and fingerprint imaging. In some examples of the disclosure, an epoxy with a relatively low acoustic impedance can be combined with a filler material to increase the overall acoustic impedance of the resulting composite epoxy. The composite epoxy can be used to adhere an ultrasonic transducer array to a top layer (i.e., sensing plate or cap layer) configured to receive a touch (e.g., from a finger). The composite epoxy (with filler material) can have an acoustic impedance that is higher than the acoustic impedance of the epoxy alone, and can more closely match the acoustic impedance of the transducer array. The acoustic impedance of the composite epoxy can reduce the impedance mismatch between the transducer array and the sensing plate, which can result in reduced attenuation of the ultrasonic waves, fewer reflections, and more accurate touch sensing and fingerprint imaging.

In some examples of the disclosure, one or more matching layers having a total acoustic impedance approximately equal to the geometric mean of the acoustic impedance of the sensing plate and the acoustic impedance of the transducer array can be formed on, or affixed to, the sensing plate. In some examples, each of the one or matching layers can be formed from one or more metals. The one or more matching layers (and the attached sensing plate) can then be adhered to the transducer array using an epoxy or the composite epoxy described above. Each of the one or more matching layers can have a thickness approximately equal to a quarter-wavelength of the ultrasonic waves propagating through that matching layer. The one or more matching layers can create an acoustic impedance gradient between the transducer array and the sensing plate to reduce the acoustic impedance mismatch between the transducer array and the sensing plate, which can result in reduced attenuation of the ultrasonic waves, fewer reflections, and more accurate touch sensing and fingerprint imaging.

In some examples of the disclosure, the sensing plate can be fabricated with a nonuniform distribution of pores (e.g., holes), or perforations along one or more surfaces of the sensing plate, to create one or more acoustic impedance gradients within the sensing plate. The one or more acoustic impedance gradients can result in reduced attenuation of the ultrasonic waves, fewer reflections, higher signal-to-noise ratio (SNR) touch signals (leading to higher contrast touch and fingerprint images), and ultimately more accurate touch sensing and fingerprint imaging.

In some examples of the disclosure, geometric structures (e.g., cones) can be formed on the back of the sensing plate. The geometric structures can have a peak-to-peak spacing that is much less than the wavelength of the ultrasonic waves propagating through the sensing plate, and can have a peak-to-valley height that is at least three times the wavelength of the ultrasonic waves. A lower acoustic impedance material can fill the gaps between the geometric structure to produce an acoustic impedance gradient at the location of the geometric structures and the filler material. This acoustic impedance gradient can result in reduced attenuation of the ultrasonic waves, fewer reflections, and more accurate touch sensing and fingerprint imaging.

In some examples of the disclosure, because the transducer array can also generate undesired ultrasonic waves in a direction away from the sensing plate and through any underlying electronics, an absorbent layer can be formed on the back side of the ultrasonic sensing electronics to absorb the undesired ultrasonic waves and reduce the reflections of those waves. The absorbent layer can be a composite epoxy formed from Tungsten fillers and an epoxy. This absorbent layer can have an acoustic impedance that is higher than conventional epoxies, with high ultrasonic wave absorption. The absorbent layer can reduce the energy of reflections from the undesired ultrasonic waves, which can result in attenuation of undesirable/parasitic ultrasonic waves, fewer reflections, and more accurate touch sensing and fingerprint imaging.

Figure 1G:
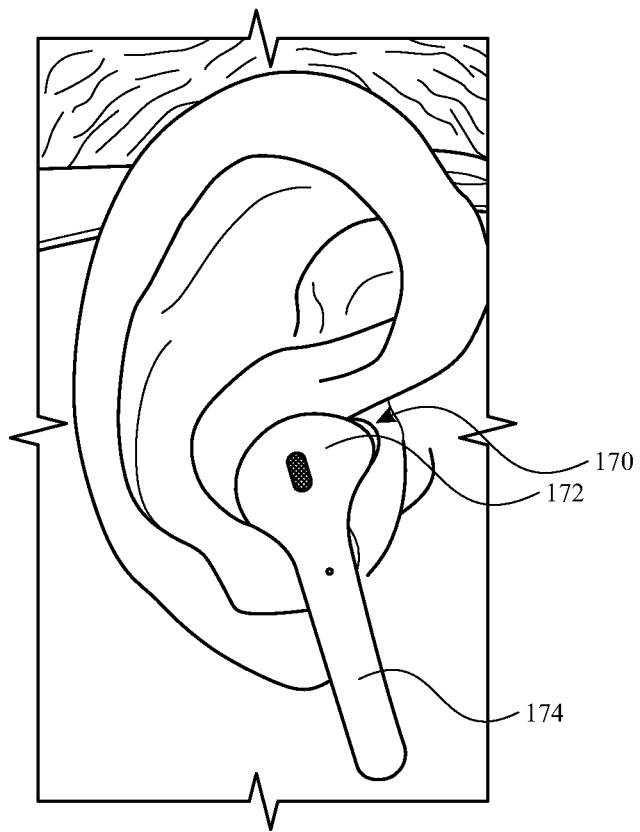

FIGS. 1A-1G illustrate systems that can employ ultrasonic touch sensing and fingerprint imaging with acoustic impedance matching according to examples of the disclosure. FIG. 1A illustrates an exemplary mobile telephone 136 that can employ ultrasonic touch sensing and fingerprint imaging with acoustic impedance matching according to examples of the disclosure. FIG. 1B illustrates an example digital media player 140 that can employ ultrasonic touch sensing and fingerprint imaging with acoustic impedance matching according to examples of the disclosure. FIG. 1C illustrates an example personal computer 144 that can employ ultrasonic touch sensing and fingerprint imaging with acoustic impedance matching according to examples of the disclosure. FIG. 1D illustrates an example tablet computing device 148 that can employ ultrasonic touch sensing and fingerprint imaging with acoustic impedance matching according to examples of the disclosure. FIG. 1E illustrates an example wearable device 150 (e.g., a watch) that can employ ultrasonic touch sensing and fingerprint imaging with acoustic impedance matching according to examples of the disclosure. FIG. 1F illustrates another example wearable device, over-ear headphones 160, that can employ ultrasonic touch sensing and fingerprint imaging with acoustic impedance matching according to examples of the disclosure. FIG. 1G illustrates another example wearable device, in-ear headphones or earbuds 170, that can employ ultrasonic touch sensing and fingerprint imaging with acoustic impedance matching according to examples of the disclosure. It should be understood that the example devices illustrated in FIGS. 1A-1G are provided by way of example, and other types of devices can employ ultrasonic touch sensing and fingerprint imaging with acoustic impedance matching.

Ultrasonic touch sensing and fingerprint imaging with acoustic impedance matching can be incorporated in the above described systems to improve the touch sensing and fingerprint imaging capabilities of the system. In some examples, a touch screen (e.g., capacitive, resistive, etc.) can be augmented with ultrasonic touch sensing and acoustic impedance matching to provide enhanced sensing capabilities (e.g., fingerprint imaging in addition to touch sensing). In some examples, an otherwise non-touch sensitive display can be augmented with ultrasonic touch sensing and acoustic impedance matching to provide touch sensing capability (e.g., fingerprint imaging). In such examples, the display can be implemented without the stack-up required for a capacitive touch screen. In some examples, ultrasonic touch sensing with acoustic impedance matching can be used to provide touch sensing capability (e.g., fingerprint imaging) for a non-display surface. For example, ultrasonic touch sensing with acoustic impedance matching can be used to provide fingerprint imaging capabilities on a button of a watch, earbuds, a track pad (e.g., trackpad 146 of personal computer 144), a scroll wheel, part or all of the housing, or any other surfaces of the device (e.g., on the front, rear or sides).

As the examples of FIGS. 1E-1G illustrate, some examples of the disclosure are particularly directed to wearable devices, which can provide users with immediately accessible input mechanisms for initiating or performing various functions, and secure authentication and access to the wearable device and/or paired devices through fingerprint imaging. In some examples, ultrasonic fingerprint imaging capability can be integrated within existing wearable device structures. In these examples, a user can touch a touch-sensitive area on the wearable device structure with one or more fingers, and ultrasonic transducers with acoustic impedance matching can detect these touches and capture a fingerprint image to initiate or perform functions such as user verification. For example, ultrasonic touch sensing and fingerprint imaging with acoustic impedance matching can be integrated into the button of watch 150, or into accessible areas of over-ear headphones 160 or in-ear headphones 170.

Figure 2:
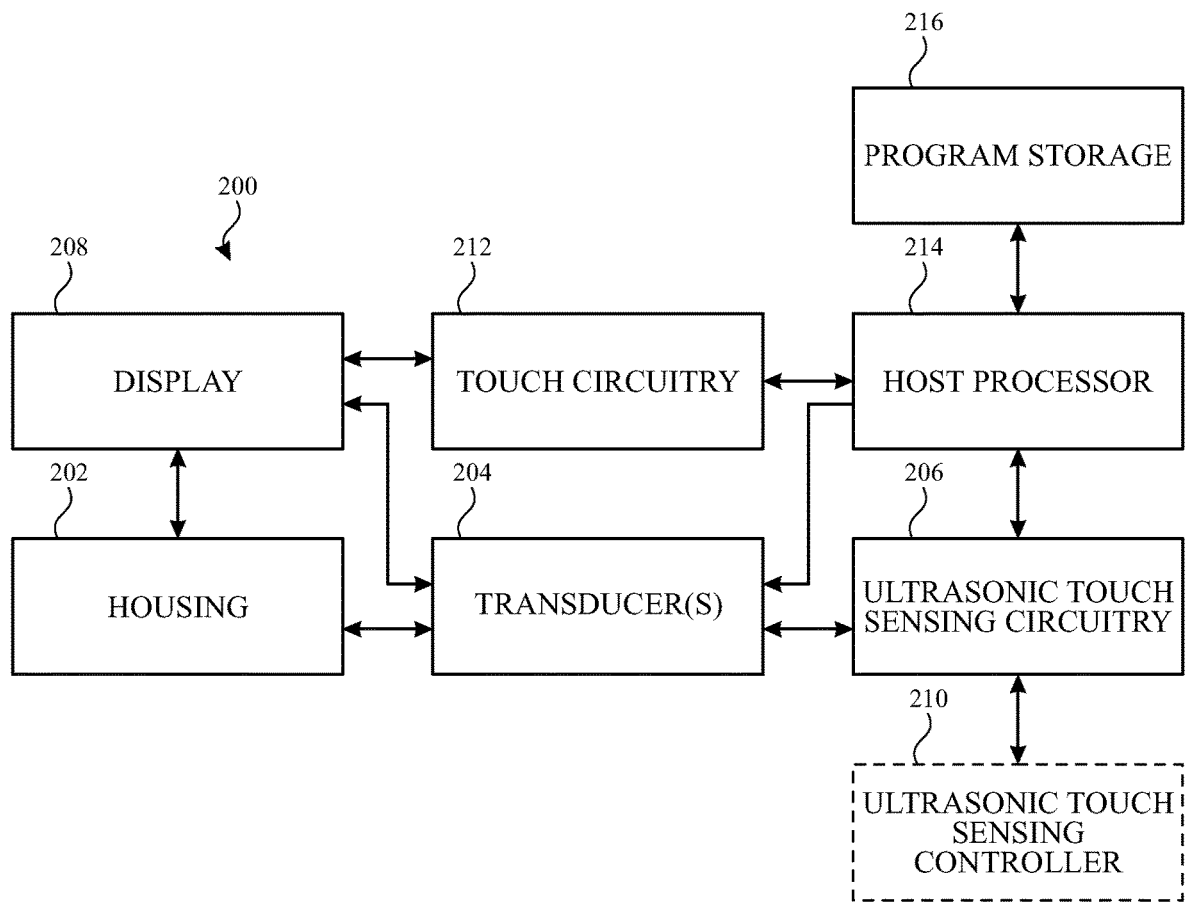
FIG. 2 illustrates a block diagram of an electronic device including ultrasonic touch sensing and fingerprint imaging with acoustic impedance matching according to examples of the disclosure.

FIG. 2 illustrates a block diagram of an electronic device including ultrasonic touch sensing and fingerprint imaging with acoustic impedance matching according to examples of the disclosure. In some examples, housing 202 of device 200 (e.g., corresponding to devices 136, 140, 144, 148, 150, 160 and 170 above) can be coupled (e.g., mechanically) with one or more ultrasonic transducers 204. In some examples, transducers 204 can be an array of piezoelectric transducers, which can be made to vibrate by the application of electrical signals when acting as a transmitter, and generate electrical signals based on detected vibrations when acting as a receiver. In some examples, transducers 204 can be formed from a PMUT array or piezoelectric ceramic material (e.g., PZT or KNN) or a piezoelectric plastic material (e.g., PVDF or PLLA). In various examples, transducers 204 can be bonded to housing 202 by a bonding agent (e.g., a composite epoxy), deposited on one or more surfaces through processes such as deposition, lithography, or the like, or integrally formed within the housing. When electrical energy is applied to transducers 204 and causes them to vibrate, the one or more surfaces in contact with the transducers can also be caused to vibrate, and the vibrations of the molecules of the surface material can propagate as an ultrasonic wave through the one or more surfaces/materials. In some examples, vibration of transducers 204 can be used to produce ultrasonic waves at a selected frequency in the medium of the surface of the electronic device.

In some examples, transducers 204 can be partially or completely disposed on (or coupled to) a portion of display 208, which in some examples can be integrated with additional (non-ultrasonic) touch circuitry 212 to a form touch screen, although it should be understood that some example devices do not include either a display 208 or additional touch circuitry 212 (their optional nature indicated by dashed lines). Device 200 can further include ultrasonic touch sensing circuitry 206, which can perform touch sensing and fingerprint imaging and can include circuitry for driving electrical signals to stimulate vibration of transducers 204 (e.g., transmit circuitry), as well as circuitry for sensing electrical signals output by transducers 204 when the transducer is stimulated by received ultrasonic energy (e.g., receive circuitry). In some examples, timing operations for ultrasonic touch sensing circuitry 206 can optionally be provided by a separate ultrasonic touch sensing controller 210 that can control the timing of operations by ultrasonic touch sensing circuitry 206, including touch and fingerprint sensing and imaging. In some examples, ultrasonic touch sensing controller 210 can be coupled between ultrasonic touch sensing circuitry 206 and host processor 214. In some examples, controller functions can be integrated with ultrasonic touch sensing circuitry 206 (e.g., on a single integrated circuit). Output data from ultrasonic touch sensing circuitry 206 can be output to a host processor 214 for further processing to determine a location of an object contacting the device (e.g., the location of fingerprint ridges). In some examples, the processing for determining the location of the contacting object can be performed by ultrasonic touch sensing circuitry 206, ultrasonic touch sensing controller 210 or a separate sub-processor of device 200 (not shown).

Host processor 214 can receive ultrasonic and optionally other touch sensor outputs (e.g., capacitive) and non-touch sensor outputs and initiate or perform actions based on those sensor outputs. Host processor 214 can also be connected to program storage 216 and optionally to display 208. Host processor 214 can, for example, communicate with display 208 to generate an image on the display, such as an image of a user interface (UI), and can use ultrasonic touch sensing circuitry 206 (and, in some examples, their respective controllers), and in some examples, touch sensing circuitry 212, to detect a touch on or near display 208, such as a touch input and/or force input at the displayed UI. The touch input can be used by computer programs stored in program storage 216 to perform actions that can include, but are not limited to, secure authentication and access, moving an object such as a cursor or pointer, scrolling or panning, adjusting control settings, opening a file or document, viewing a menu, making a selection, executing instructions, operating a peripheral device connected to the host device, answering a telephone call, placing a telephone call, terminating a telephone call, changing the volume or audio settings, storing information related to telephone communications such as addresses, frequently dialed numbers, received calls, missed calls, logging onto a computer or a computer network, permitting authorized individuals access to restricted areas of the computer or computer network, loading a user profile associated with a user's preferred arrangement of the computer desktop, permitting access to web content, launching a particular program, encrypting or decoding a message, and/or the like. Host processor 214 can also perform additional functions that may not be related to touch processing.

Note that one or more of the functions described herein can be performed by firmware stored in memory and executed by ultrasonic touch sensing circuitry 206 (or their respective controllers), and in some examples, touch circuitry 212, or stored in program storage 216 and executed by host processor 214. The firmware can also be stored and/or transported within any non-transitory computer-readable storage medium for use by or in connection with an instruction execution system, apparatus, or device, such as a computer-based system, processor-containing system, or other system that can fetch the instructions from the instruction execution system, apparatus, or device and execute the instructions. In the context of this document, a "non-transitory computer-readable storage medium" can be any medium (excluding a signal) that can contain or store the program for use by or in connection with the instruction execution system, apparatus, or device. The non-transitory computer readable medium storage can include, but is not limited to, an electronic, magnetic, optical, electromagnetic, infrared, or semiconductor system, apparatus or device, a portable computer diskette (magnetic), a random access memory (RAM) (magnetic), a read-only memory (ROM) (magnetic), an erasable programmable read-only memory (EPROM) (magnetic), a portable optical disc such a CD, CD-R, CD-RW, DVD, DVD-R, or DVD-RW, or flash memory such as compact flash cards, secured digital cards, USB memory devices, memory sticks, and the like.

The firmware can also be propagated within any transport medium for use by or in connection with an instruction execution system, apparatus, or device, such as a computer-based system, processor-containing system, or other system that can fetch the instructions from the instruction execution system, apparatus, or device and execute the instructions. In the context of this document, a "transport medium" can be any medium that can communicate, propagate or transport the program for use by or in connection with the instruction execution system, apparatus, or device. The transport readable medium can include, but is not limited to, an electronic, magnetic, optical, electromagnetic or infrared wired or wireless propagation medium.

It is to be understood that device 200 is not limited to the components and configuration of FIG. 2, but can include other or additional components in multiple configurations according to various examples. Additionally, the components of device 200 can be included within a single device, or can be distributed between multiple devices. Additionally, it should be understood that the connections between the components is exemplary and different unidirectional or bidirectional connections can be included between the components depending on the implementation, irrespective of the arrows shown in the configuration of FIG. 2.

Figure 3:
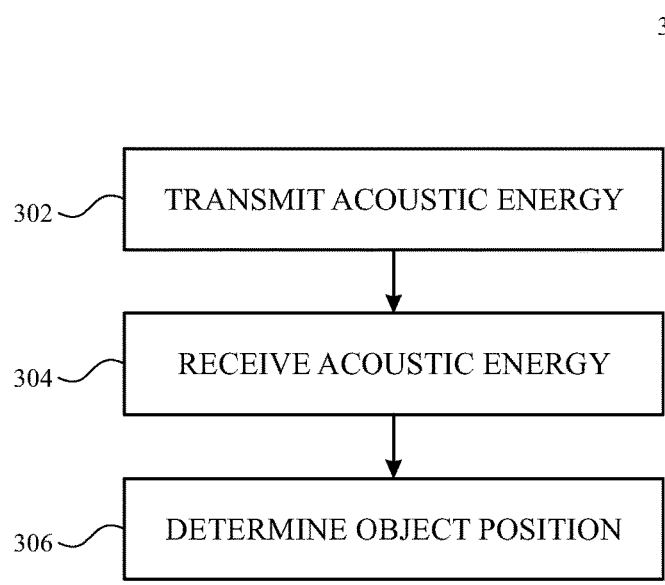
FIG. 3 illustrates a process for ultrasonic touch sensing of an object (e.g., a fingerprint ridge) in contact with a touch sensitive surface according to examples of the disclosure.

FIG. 3 illustrates an exemplary process 300 for ultrasonic touch sensing of an object (e.g., a fingerprint ridge) in contact with a touch sensitive surface according to examples of the disclosure. At 302, ultrasonic energy can be transmitted (e.g., by an array of transducers) through the thickness of a material in the form of an ultrasonic wave. In some examples, the wave can propagate as a bulk compressive wave or a bulk shear wave. Other propagation modes for the transmitted ultrasonic energy can also exist based on the properties of the surface material, geometry and the manner of energy transmission from the transducers to the surface of the device. In some examples, wave propagation discontinuities can occur at material layer boundaries and at the surface material (e.g., when the ultrasonic wave propagates to the touch surface opposite the transducer). Transmitted energy can propagate through the thickness until a wave propagation discontinuity at a material layer boundary or when the surface is reached, which can cause a portion of the energy to reflect. When the transmitted energy reaches one of the wave propagation discontinuities described above, some of the energy can be reflected, and a portion of the reflected energy can be directed to one or more transducers. An object, such as a finger or fingerprint ridge in contact with the surface, can have an effect on the amount of energy reflected at the surface propagation discontinuity.

At 304, returning ultrasonic energy can be received, and the ultrasonic energy can be converted to an electrical signal by one or more transducers. At 306, the ultrasonic sensing system can determine whether one or more objects are contacting the surface of the device, and can further detect the position of one or more objects based on the received ultrasonic energy. In some examples, baseline reflected energy from one or more intentionally included wave propagation discontinuities (e.g., edges) can be compared to a measured value of reflected energy corresponding to the one or more wave propagation discontinuities. The baseline reflected energy can be determined during a measurement when no object (e.g., fingerprint ridge) is in contact with the surface. Deviations of the reflected energy from the baseline can be correlated with a presence of an object touching the surface.

Although process 300, as described above, generally refers to reflected waves received by the same transducer(s) that transmitted the waves, in some examples, the transmitter and receiver functions can be separated such that the transmission of ultrasonic energy at 302 and receiving ultrasonic energy at 304 may occur at different co-located transducers (e.g., one transducer in a transmit configuration and one transducer in a receive configuration). In some examples, the ultrasonic energy can be transmitted along and/or through the surface by one or more transducers and received at a different location along the surface by one or more additional transducers (not shown). The attenuation of the received ultrasonic energy can be used to detect the presence of and/or identify the position of one or more objects on the surface. In some examples, the transmitted ultrasonic energy can be received at the transmitting transducer and also received at one or more other non-transmitting transducers located in different positions (e.g., at different locations along the surface). Energy can reflect from one or more objects at multiple angles, and the energy received at all of the receiving transducers can be used to determine the position of the one or more objects.

Figure 4A:
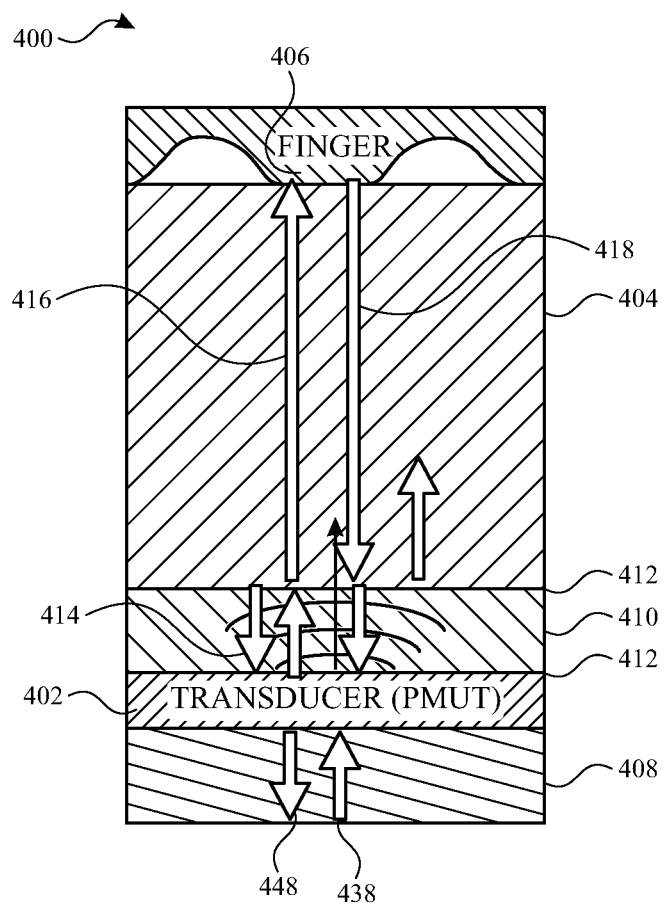
FIG. 4A illustrates a touch sensing stackup using an array of PMUTs according to examples of the disclosure.

FIG. 4A illustrates touch sensing stackup 400 using an array of PMUTs 402 according to examples of the disclosure. In the example of FIG. 4A, PMUT array 402 can be used to provide ultrasonic waves 416 through sensing plate 404 to the touch surface, where the presence or absence of fingerprint ridges 406 can alter the amount of energy reflected back to the PMUT array as finger signature 418. These changes in reflected energy can be used to determine an image of the fingerprint of a user. However, when PMUT array 402 and associated electronics 408 are affixed to the back of sensing plate 404 using an adhesive such epoxy 410, the resulting stackup of materials (e.g., PMUT array, epoxy, and sensing plate) can create acoustic impedance mismatches at material layer boundaries 412. In particular, epoxy 410 can have a relatively low acoustic impedance (e.g., about 3 MRayl), while sensing plate 404 can have a much higher acoustic impedance of about 46 MRayl. These acoustic impedance mismatches can reduce the transmission of ultrasonic energy to/from PMUT array 402 and can create parasitic reflections 414, both of which can adversely affect the ability of the PMUT array to perform touch sensing or fingerprint imaging.

Sensing plate 404 can be made from a wide range of materials such as Aluminum (Al), stainless steel (SUS), ceramics such as zirconia ($ZrO_2$), titanium (Ti) and the like. Although FIG. 4A illustrate PMUT array 402, in other examples different types, numbers, and arrangements of ultrasonic transducers can also be utilized.

Figure 4B:
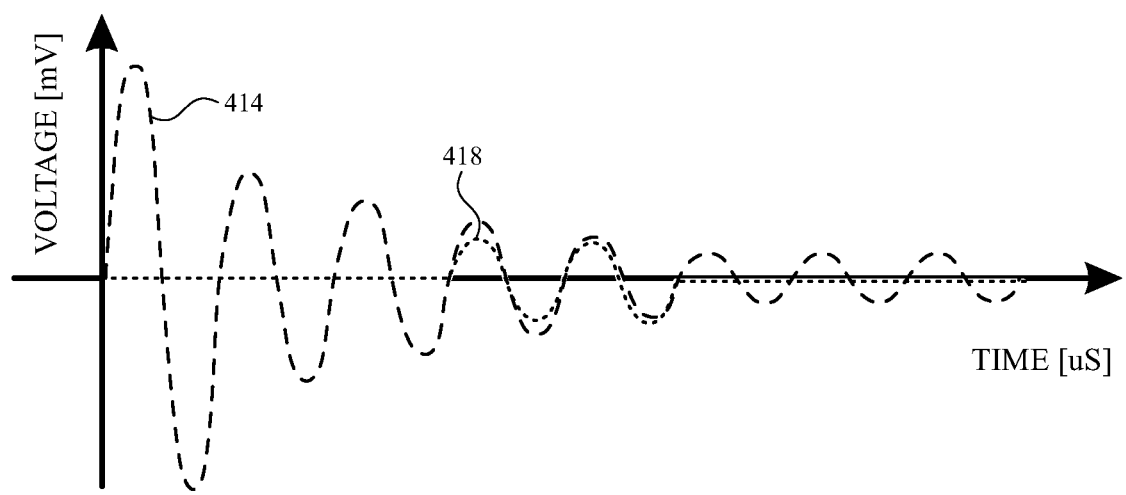
FIG. 4B illustrates parasitic reflections from acoustic impedance mismatches and a finger signature reflected back from the touch surface of a sensing plate when an epoxy with low acoustic impedance is used according to examples of the disclosure.

FIG. 4B illustrates parasitic reflections 414 from acoustic impedance mismatches and finger signature 418 reflected back from the touch surface of sensing plate 404 when epoxy 410 with low acoustic impedance is used according to examples of the disclosure. In the example of FIG. 4B, an acoustic impedance mismatch can form between epoxy 410 and sensing plate 404. Because of this mismatch, acoustic signals generated by PMUT array 402 can reflect back at boundary 412 between epoxy 410 and sensing plate 404 (regardless of whether a finger is present at the touch surface of the sensing plate), and be received at the PMUT array as parasitic reflections 414. Note that because parasitic reflections 414 travel a shorter distance than finger signature 418, the parasitic reflections can arrive back at PMUT array 402 before the finger signature. Accordingly, for the first few cycles of parasitic reflections 414 shown in FIG. 4B, no finger signature 418 is present. As the example of FIG. 4B illustrates, because significant ultrasonic wave energy can be reflected in the form of parasitic reflections 414, the amplitude (energy) of the parasitic reflections can be large, while the amplitude of finger signature 418 can be detrimentally reduced. In general, an ultrasonic fingerprint imaging system is often constrained by multiple parameters such that the signal-to-noise ratio (SNR) of the system can be undesirably low when high acoustic impedance sensing plates are used. Examples of the disclosure reduce acoustic impedance mismatches to improve the SNR.

Examples of the disclosure are directed to improving the accuracy of ultrasonic touch sensing and fingerprint imaging by employing acoustic impedance matching to reduce parasitic reflections and increase finger signature energy in devices such as desktop, laptop and tablet computing devices, smartphones, media players, wearables such as watches and health monitoring devices, smart home control and entertainment devices, headphones and earbuds, and devices for computer-generated environments such as augmented reality, mixed reality, or virtual reality environments. Some examples of the disclosure are particularly directed to wearable devices, which can provide users with immediately accessible input mechanisms for initiating or performing various functions, and secure authentication and access to the wearable device and/or paired devices through fingerprint imaging.

Figure 5A:
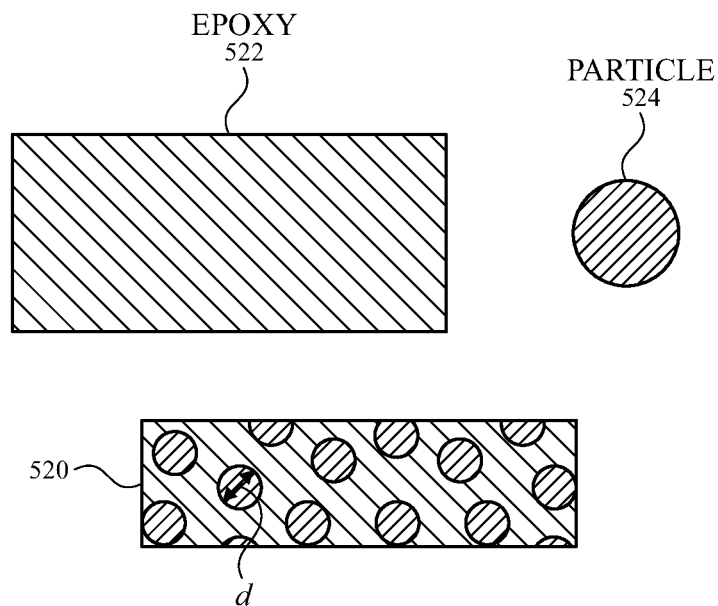
FIG. 5A illustrates a composite epoxy which can include an epoxy and filler particles suspended in the epoxy according to examples of the disclosure.

FIG. 5A illustrates composite epoxy 520 which can include epoxy 522 and filler particles 524 suspended in the epoxy according to examples of the disclosure. In some examples, the materials and sizes of the components of composite epoxy 520 can be selected to reduce the acoustic impedance mismatch between the PMUT array and the sensing plate. Because the acoustic impedance of the sensing plate can be very high (e.g., 46 MRayl for SUS) as compared to the much lower acoustic impedance of epoxy 522 (e.g., 3 MRayl), in some examples filler particles 524 can be added to the epoxy to produce composite epoxy 520 with an increased acoustic impedance as compared to the epoxy. In optimum examples, the acoustic impedance of composite epoxy 520 can be increased to match the acoustic impedance of the underlying PMUT array (e.g., 11 MRayl) or electronics (e.g., 22 MRayl). However, in other examples that may be easier to achieve, composite epoxy 520 can have an increased acoustic impedance of 7 MRayl (increased as compared to the epoxy by itself). The increased acoustic impedance can reduce the acoustic impedance mismatch between the PMUT array and the sensing plate, which can increase the transmission of ultrasonic energy to/from the PMUT array and can reduce parasitic reflections, both of which can improve the ability of the PMUT array to perform fingerprint imaging.

In some examples, composite epoxy 520 can be formulated to be temperature stable (i.e., low thermal drift) so that its properties do not change over temperature. Accordingly, epoxy 522 can be selected to have a "glass transition" (the temperature at which the epoxy begins to transition from a hard or brittle state to a softer, more viscous state) well above the expected operating temperature of the device (e.g., up to 60 degrees C.). In some examples, epoxy 522 can be selected to have a glass transition of 80-100 degrees C., so that the properties of the epoxy are stable over the expected temperature range of operation. Above this temperature range, the epoxy can become too soft, and the modulus can drop, which can cause an undesired shift in the acoustic impedance.

In some examples, the diameter d of filler particles 524 can be selected to be much smaller than the wavelength of the ultrasonic waves propagating through composite epoxy 520 so that ultrasonic energy reflection/scattering is minimized. If the diameter d is too large, filler particles 524 can reflect/scatter the waves. In some examples, the average wavelength of ultrasonic waves propagating through composite epoxy 520 can be about 100-150 microns, so the particle size can be selected to be between 5-15 microns, and in some instances less than 5 microns.

The volume fraction of particles 524 in epoxy 522 can be selected to achieve a desired acoustic impedance. Although the acoustic impedance of composite epoxy 520 should ideally match the acoustic impedance of the PMUT array (e.g., have an acoustic impedance of about 11 MRayl), this may not be achievable in practice. Accordingly, in some examples the volume fraction of particles 524 can be selected to be about 60-70%. Higher volume fractions can result in a higher acoustic impedance, but at volume fractions above about 70%, the integrity of composite epoxy 520 can be compromised. For example, adhesion capability can be reduced, and the viscosity can become so high that the composite epoxy can be difficult to dispense and apply with a desired thinness (e.g., 15-45 microns).

In view of the above, in some examples of the disclosure a 0-3 composite epoxy can be utilized that includes Alumina filler (40% volume fraction, particle size <5 um) and an epoxy (e.g., Epo-tek® 301 epoxy having an acoustic impedance of about 3 MRayl). The Alumina filler can increase the acoustic impedance of the composite epoxy to about 7 MRayl, and in some instances, between 8-11 MRayl. Although the sensing plate can have a much higher acoustic impedance (e.g., about 46 MRayl for stainless steel (SUS), 30 MRayl for titanium, and 27 MRayl for Aluminum), nevertheless the increased acoustic impedance of the composite epoxy (as compared to the lower acoustic impedance of 3 MRayl for the epoxy) can reduce the impedance mismatch between the PMUT array and the sensing plate, producing reduced attenuation of the ultrasonic waves, increased finger signature energy, and improved ultrasonic touch sensing and fingerprint imaging.

Figure 5B:
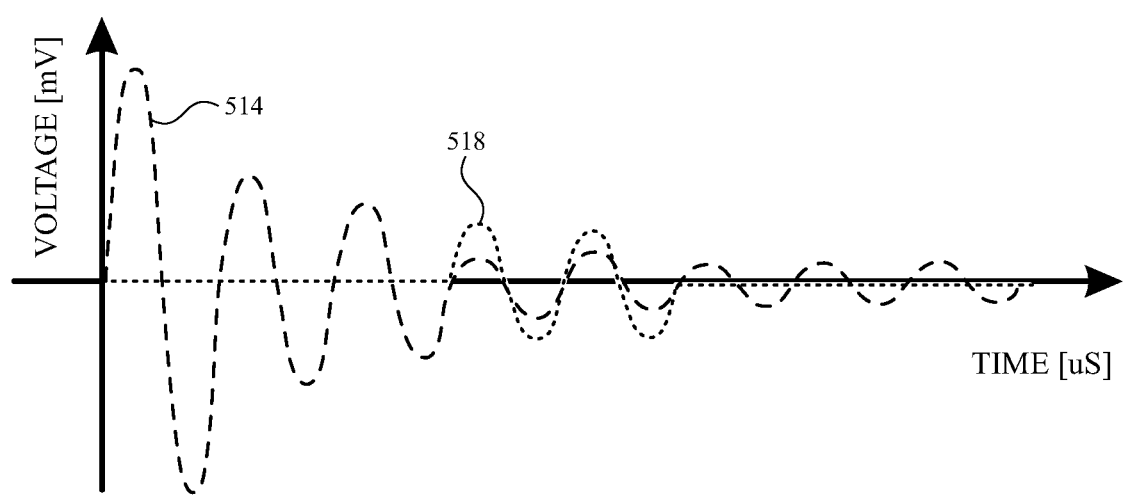
FIG. 5B illustrates parasitic reflections from acoustic impedance mismatches and a finger signature reflected back from the touch surface of a sensing plate when a composite epoxy is utilized according to examples of the disclosure.

FIG. 5B illustrates parasitic reflections 514 from acoustic impedance mismatches and finger signature 518 reflected back from the touch surface of sensing plate 504 when composite epoxy 520 is utilized according to examples of the disclosure. Because of the reduced acoustic impedance mismatch provided by composite epoxy 520, less energy from the ultrasonic signals generated by the PMUT array can be reflected (regardless of whether a finger is present at the touch surface of the sensing plate) and received back at the PMUT array as parasitic reflections. Note that because parasitic reflections 514 can travel a shorter distance than finger signature 518, the parasitic reflections can arrive back at the PMUT array before the finger signature. Accordingly, for the first few cycles of parasitic reflections 514 shown in FIG. 5B, no finger signature 518 is present. As the example of FIG. 5B illustrates, because less ultrasonic wave energy can be reflected in the form of parasitic reflections 514, the amplitude (energy) of the parasitic reflections can decrease, while the amplitude of finger signature 518 can advantageously increase (as compared to FIG. 4B).

As noted above, the materials and sizes of the components of the composite epoxy can be selected to reduce the acoustic impedance mismatch between the PMUT array and the sensing plate. To further improve acoustic impedance matching, in other examples of the disclosure a matching layer can be formed on the back of the sensing plate to create an acoustic impedance gradient between the lower acoustic impedance PMUT array and the high acoustic impedance sensing plate.

Figure 6A:
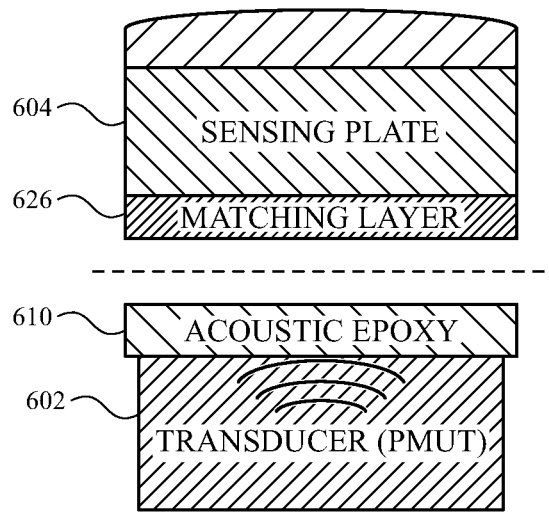
FIG. 6A illustrates a matching layer affixed to a sensing plate while separated from an epoxy and a PMUT array according to examples of the disclosure.

FIG. 6A illustrates matching layer 626 affixed to sensing plate 604 while separated from epoxy 610 and PMUT array 602 according to examples of the disclosure. Matching layer 626 can produce a more gradual acoustic impedance transition (i.e., a bridge or gradient) between PMUT array 602 and sensing plate 604. This acoustic impedance gradient can reduce the amount of ultrasonic wave reflections generated at the interface between PMUT array 602 and sensing plate 604 and allow more energy to pass through to the surface of the sensing plate for touch detection and fingerprint imaging. By selecting the thickness and composition of matching layer 626 in accordance with the characteristics of sensing plate 604, different matching layers can be developed for use with different sensing plate materials.

Figure 6B:
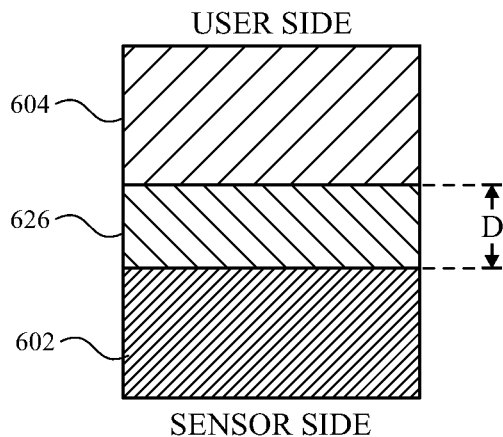
FIG. 6B illustrates a matching layer sandwiched between a sensing plate and a PMUT array according to examples of the disclosure (with the epoxy layer omitted for clarity).

FIG. 6B illustrates matching layer 626 sandwiched between sensing plate 604 and PMUT array 602 according to examples of the disclosure (with the epoxy layer omitted for clarity). In some examples, matching layer 626 can have an acoustic impedance Zm between the acoustic impedance Zt of PMUT array 602 and the acoustic impedance Zp of sensing plate 604. In one example, Zm can be the geometric mean of Zp (46 MRayl for SUS) and Zt (11 MRayl), or 22.5 MRayl. Selecting matching layer 626 to have an acoustic impedance approximately equal to the geometric mean of the two adjacent materials can improve the energy transfer of the ultrasonic waves as they propagate through the matching layer. In some examples, the thickness d of matching layer 626 can be one-quarter of the wavelength of the ultrasonic waves propagating through the matching layer. Maximum energy transfer of a signal through matching layer 626 can occur at this quarter wavelength thickness.

The table below provides an example matching layer acoustic impedance for four different sensing plate materials and a PMUT array according to some examples of the disclosure.

| PMUT Zt | 11 MRayl | 11 MRayl | 11 MRayl | 11 MRayl |
|---|---|---|---|---|
| Sensing plate Zp | Al (17.04 MRayl) | Ti (26.6 MRayl) | SS (46 MRayl) | $ZrO_2$ (49 MRayl) |
| Matching layer Zm | 13.7 MRayl | 17.08 MRayl | 22.5 MRayl | 23.2 MRayl |

Aluminum, tin and titanium have acoustic impedances in the rage of 13.7 to 23.2 MRayl, so those materials can be used as the matching layer. Using a stainless steel sensing plate as one example, an aluminum matching layer with a thickness of 30 microns can have an acoustic impedance of about 17 MRayl and a maximum transmission of 94%, a titanium matching layer with a thickness of 30 microns can have an acoustic impedance of about 27 MRayl and a maximum transmission of 95%, and a tin matching layer with a thickness of 17 microns can have an acoustic impedance of about 24 MRayl and a maximum transmission of 99%. For a broadband pulse, the transmission decreases when the frequency is far from the optimum frequency.

In other examples, matching layer 626 can be formed from multiple matching sub-layers, each sub-layer in a stackup of sub-layers having an increasing ultrasonic impedance from the bottom sub-layer to the top sub-layer adjacent to the sensing plate. In some examples, all matching sub-layers can have a total thickness approximately equal to a quarter wavelength of the frequency propagating through the matching sub-layers. In other examples, each matching sub-layer can have a thickness approximately equal to a quarter wavelength of the frequency propagating through that matching sub-layer. With reference to FIG. 6B, matching layer 626 can be replaced with multiple matching sub-layers formed on the back of sensing plate 604, and later adhered to the lower PMUT layer 602. In one example, an aluminum matching sub-layer can be formed on the sensing plate, and then a magnesium matching sub-layer (with a lower acoustic impedance) can be formed on the aluminum matching sub-layer. In some examples, each matching sub-layer can be tuned to have an acoustic impedance that is approximately the geometric mean of the acoustic impedance of the material on either side of that matching sub-layer.

Figure 6C:
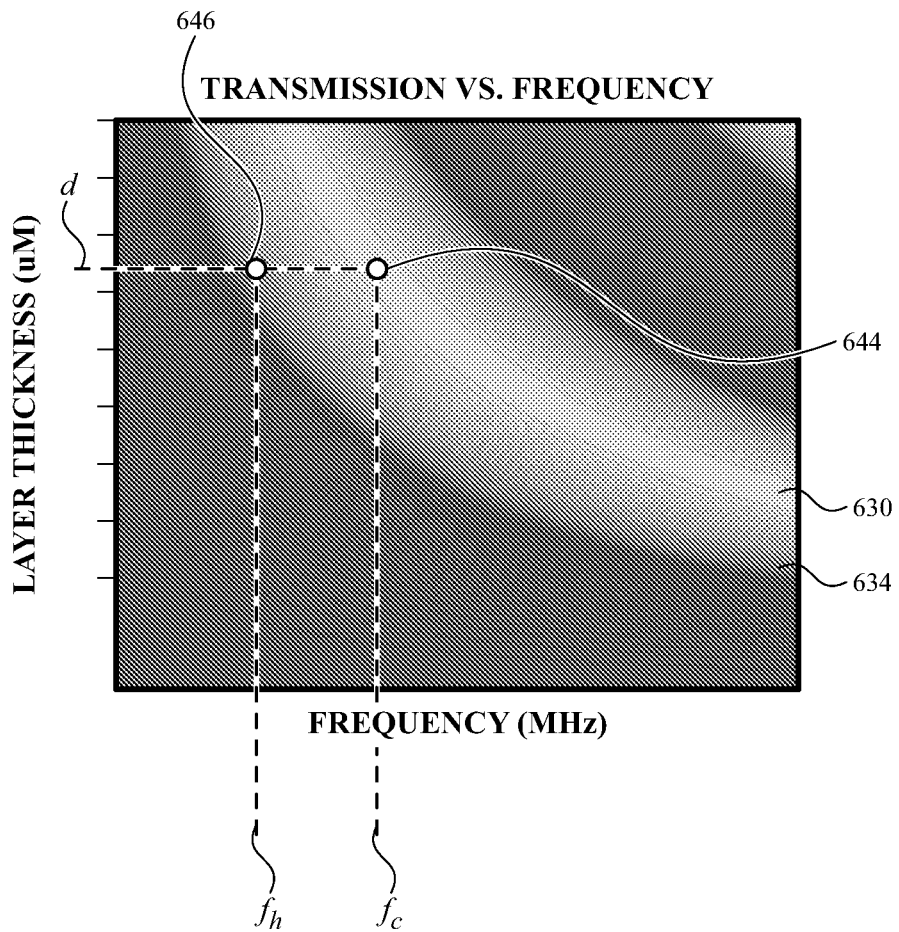
FIG. 6C illustrates the transmittance of energy of an ultrasonic signal through a single matching layer of a particular material over a range of frequencies and layer thicknesses according to examples of the disclosure.

FIG. 6C illustrates the transmittance of energy of an ultrasonic signal through a single matching layer of a particular material over a range of frequencies and layer thicknesses according to examples of the disclosure. In the example of FIG. 6C, at the center frequency $f_c$ of the ultrasonic signal, energy transfer through the matching layer having a thickness d equal to a quarter wavelength of the ultrasonic signal is maximized, as indicated by point 644 located in high energy transmission band 630. On the other hand, a frequency component $f_h$ of the ultrasonic signal away from the center frequency can have much less energy transfer, as indicated by point 646 located in lower energy transmission band 634.

However, if multiple matching sub-layers are employed as described above, acoustic wave energy transfer can be improved over a wider band of frequencies. For example, the transmittance graph of multiple matching layers can have a high energy transmission band 630 that is wider than that shown in the example of FIG. 6C. This wider high energy transmission band 630 can enable more energy from the ultrasonic waves to propagate through to the touch surface of the sensing plate, with less reflections.

Figure 7A:
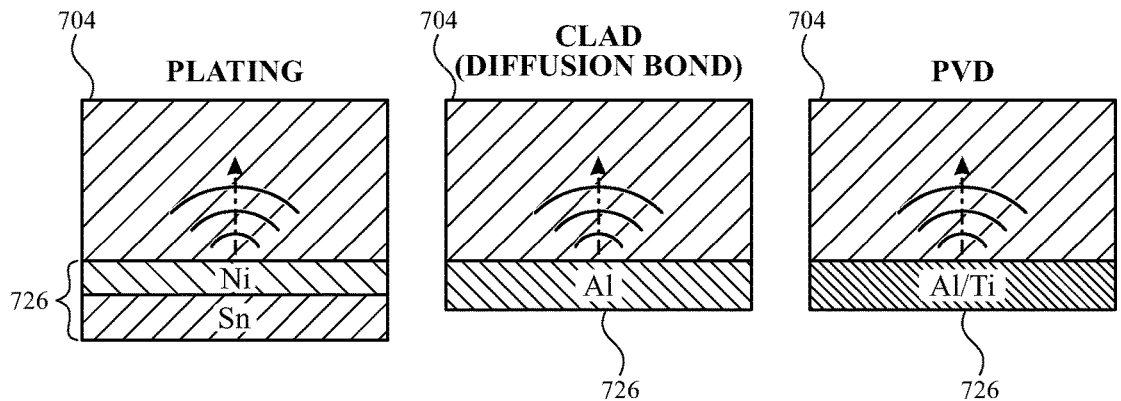
FIG. 7A illustrates several materials and techniques that can be used to form a matching layer on the back side of a sensing plate according to examples of the disclosure.

FIG. 7A illustrates several materials and techniques that can be used to form matching layer 726 on the back side of sensing plate 704 according to examples of the disclosure. In the left stackup of FIG. 7A, a thin layer of nickel (Ni) having a thickness of less than 5 microns can be deposited using physical vapor deposition (PVD) onto the back side of sensing plate 704 formed from either SUS or zirconia ($ZrO_2$), both having an acoustic impedance of around 50 MRayl, followed by a layer of tin (Sn) having a thickness of about 17 microns. The Ni layer is needed as a seed layer when $ZrO_2$ is used as sensing plate 704 because $ZrO_2$ is a nonconductive ceramic. After the Ni layer is formed, the Sn layer can be plated on the Ni layer. Because the nickel is so thin, the tin layer predominantly provides the matching layer characteristics. In the center stackup of FIG. 7A, aluminum (Al) about 30 microns thick can be cladded (diffusion bonded) with sensing plate 704 formed from either SUS or titanium (Ti) to form matching layer 726. In the right stackup of FIG. 7A, PVD can be used to deposit both Al and Ti material onto the back side of sensing plate 704 formed from SUS, $ZrO_2$, or Ti to form matching layer 726. Any of these three methods can be used to form matching layer 726, though in practice the three methods can result in different types of nonuniformities that can affect the acoustic impedance.

Figure 7B:
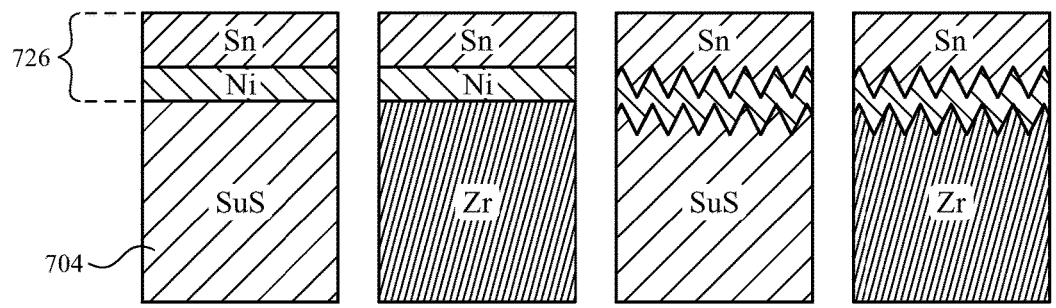
FIG. 7B illustrates the formation of a matching layer using plating according to examples of the disclosure.

FIG. 7B illustrates the formation of a matching layer using plating according to examples of the disclosure. In the example of FIG. 7B, a thin film of nickel (e.g., less than 2 microns) can first be deposited using PVD onto a SUS (450 microns) or $ZrO_2$ (800 microns) sensing plate 704 (note that FIG. 7B shows the sensing plate at the bottom). The Sn layer can protect delicate structures and improve reliability. Because the nickel layer is thin, it can be negligible in terms of the desired quarter wavelength thickness. The Sn layer can have a desired quarter wave thickness of about 17 microns and can be the primary contributor of acoustic impedance matching. Note that matching layer 726 need not have an exact quarter wavelength thickness, because the acoustic impedances of the PMUT array, matching layer, sensing plate, etc. are so interdependent that the actual preferred matching layer thickness can be determined by simulations of the whole stackup. The left two stackups of FIG. 7B illustrate Ni and Sn plated over flat SUS and $ZrO_2$ sensing plates 704. The right two stackups of FIG. 7B illustrate Ni and Sn plated over SUS and $ZrO_2$ sensing plates 704 formed with geometric structures (e.g., cones) for improved acoustic impedance matching, as will be described below.

Figure 7C:
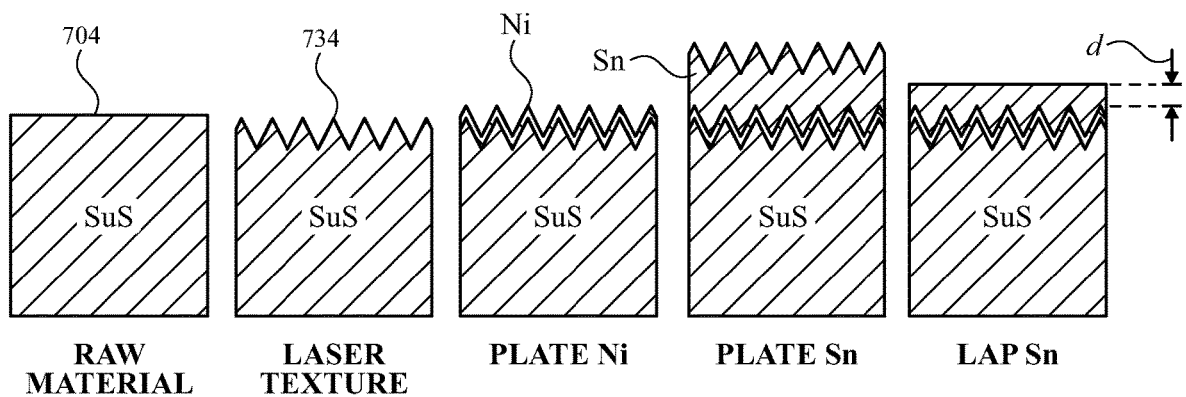
FIG. 7C illustrates a plating process flow for forming and plating a stainless steel (SUS) sensing plate with geometric structures according to examples of the disclosure.

FIG. 7C illustrates a plating process flow for forming and plating a SUS sensing plate with geometric structures according to examples of the disclosure. In the example of FIG. 7C (from left to right), raw SUS material can be laser textured to form sensing plate 704 with geometric structures 734 (note that FIG. 7C shows the sensing plate at the bottom). Sensing plate 704 can then be deposited using PVD with a thin layer of Ni (<5 microns), followed by a thicker layer of Sn, which can primarily act as the matching layer. The nickel plating can serve as a seed layer so that the Sn layer can have a material upon which to plate in the plating bath. Because the Sn is plated over an irregular surface, the plated Sn can also have an irregular surface. Accordingly, the last step in FIG. 7C can be to flatten the Sn layer to have a desired quarter wavelength thickness d (e.g., 30 microns), and to provide a smooth surface for epoxy bonding.

Figure 7D:
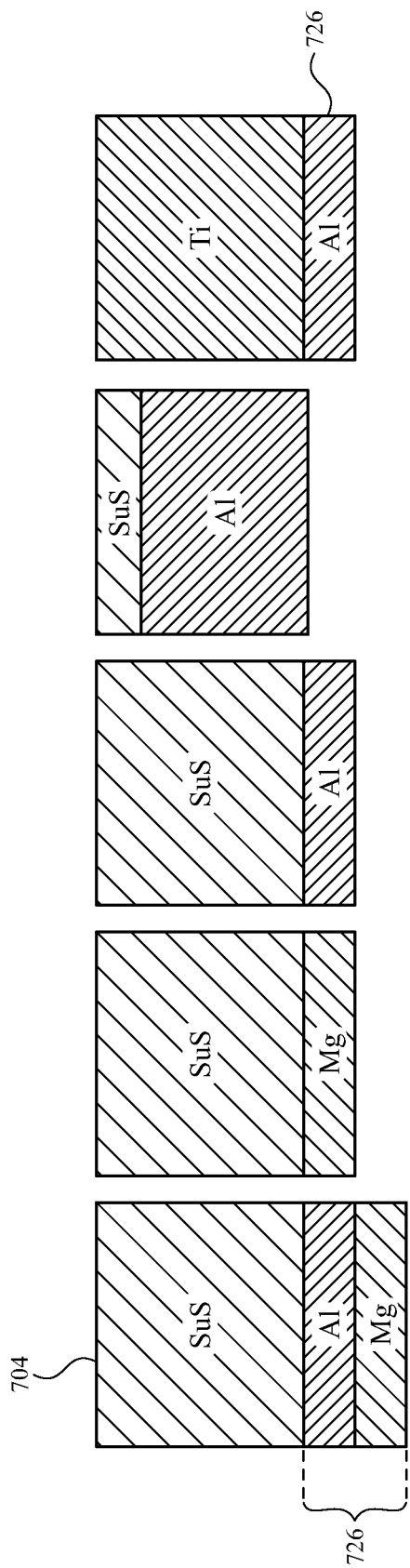
FIG. 7D illustrates the formation of a matching layer using cladding according to examples of the disclosure.

FIG. 7D illustrates the formation of a matching layer using cladding according to examples of the disclosure. In the left three stackups of FIG. 7D, Al and/or magnesium (Mg) each having a thickness of about 30 microns can be cladded with a SUS sensing plate 704 having a thickness of about 450 microns. Cladding involves fusing rolls of dissimilar metals together using a high pressure roller and high heat. At the material boundaries, some atoms of one material are diffused into the other material such that the two materials stick together. When cladded, the Al or Mg material can serve as matching layer 726. The leftmost stackup in FIG. 7D illustrates the cladding of Mg having a thickness of about 30 microns with aluminum (also having a thickness of about 30 microns) to form multiple matching layers as described above. In the rightmost stackup of FIG. 7D, Al having a thickness of about 30 microns can be cladded with a Ti sensing plate 704 having a thickness of about 450 microns. When cladded, the Al layer can serve as matching layer 726. The stackup second from the right in FIG. 7D illustrates the cladding of Al having a thickness of about 390 microns with a much thinner SUS layer having a thickness of 60 microns. In this stackup, the SUS layer can be a cosmetic layer with a thickness equal to about a half wavelength of the acoustic signal propagating through the SUS layer to create a self-resonating layer.

Figure 7E:
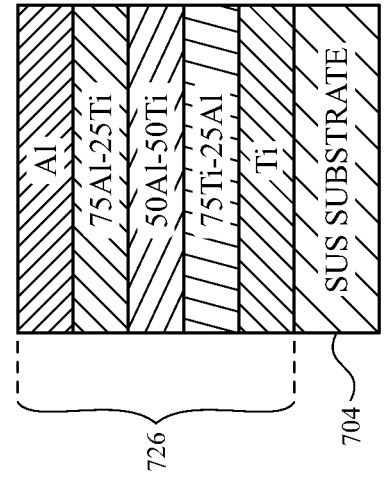
FIG. 7E illustrates the formation of a matching layer using physical vapor deposition (PVD) according to examples of the disclosure.
Figure 7E:
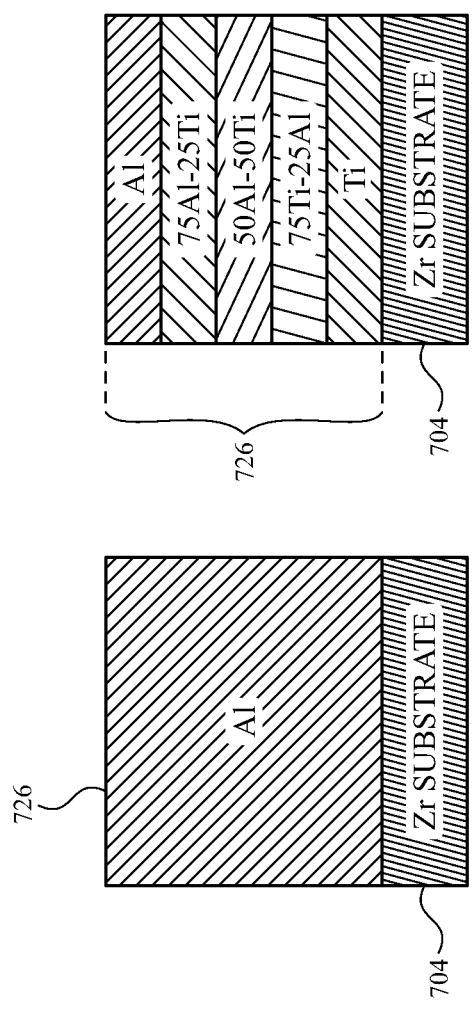

FIG. 7E illustrates the formation of a matching layer using PVD according to examples of the disclosure. In the left stackup of FIG. 7E, Al having a thickness of about 30 microns can gradually be built up on $ZrO_2$ sensing plate 704 using PVD to form matching layer 726. In the middle stackup of FIG. 7E, matching layer 726 having a thickness of about 30 microns can gradually be built up from multiple layers of Ti, Al, or combined Ti/Al (e.g., in 75%/25% or 50%/50% ratios) having a thickness of about 6 microns each and applied using PVD on $ZrO_2$ sensing plate 704. In the right stackup of FIG. 7E, matching layer 726 having a thickness of about 30 microns can gradually be built up from multiple layers of Ti, Al, or combined Ti/Al (e.g., in 75%/25% or 50%/50% ratios) having a thickness of about 6 microns each and applied using PVD on SUS sensing plate 704. In the middle and right stackups of FIG. 7E, the material layers that form matching layer 726 can be selected with different acoustic impedances to create an acoustic impedance gradient across the matching layer, which can result in fewer parasitic reflections.

The acoustic impedance gradient that can be achieved by the multiple matching layer example of FIG. 7D and the multiple material matching layer examples of FIG. 7E can also be achieved in other ways. For example, introducing micro-air bubbles or perforations into the sensing plate can reduce the effective acoustic impedance of the sensing plate.

The term "pore" and the property of "porosity" may be used herein to collectively refer to enclosed voids (i.e., pockets or bubbles) of air, gas, of other low acoustic impedance material (as compared to the acoustic impedance of the sensing plate), or open-ended perforations (i.e., notches or cavities) filled with air or other low acoustic impedance material. Because of the low acoustic impedance of air, selected gases, and other low acoustic impedance material, the presence of pores can lead to a reduction in the average acoustic impedance of the sensing plate at the location of the pores. The formation of pores in a nonuniform (variable density) distribution with the sensing plate can create an acoustic impedance gradient through the sensing plate, which can lead to fewer wave reflections, increased wave transfer energy, and more accurate touch detection and fingerprint imaging.

Figure 8A:
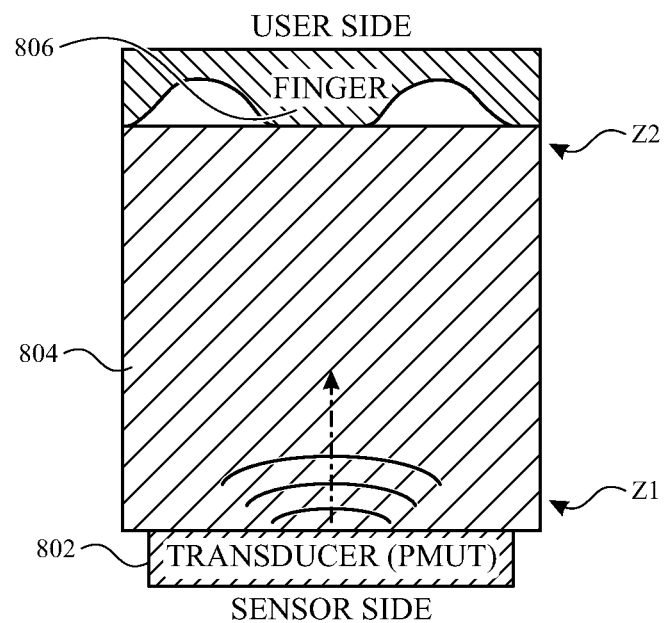
FIG. 8A illustrates a sensing plate having an internal acoustic impedance gradient created by pores according to examples of the disclosure.

FIG. 8A illustrates sensing plate 804 having an internal acoustic impedance gradient created by pores according to examples of the disclosure. In the example of FIG. 8A, PMT array 802 is affixed to sensing plate 804 (with the epoxy layer omitted for clarity), and ultrasonic waves are transmitted to/from the touch surface through the sensing plate. In some examples, sensing plate 804 can include a plurality of closed pores (e.g., air gaps, voids or bubbles) in a nonuniform distribution within the sensing plate (symbolically illustrated in FIG. 8A), with the bottom of the sensing plate having the highest porosity (highest concentration of pores) to lower the acoustic impedance $Z1$ of that portion of the sensing plate and provide a closer match with the acoustic impedance of PMUT array 802. The porosity of sensing plate 804 can gradually decrease at increasing elevations (from the perspective of FIG. 8A) within the sensing plate, such that the top of the sensing plate has the lowest porosity (lowest concentration of pores) to increase the acoustic impedance $Z2$ of that portion of the sensing plate and provide a closer acoustic impedance match with a touching finger, for example. Stated differently, as viewed from bottom to top, the effective acoustic impedance of sensing plate 804 can increase gradually as the volume fraction ratio of higher impedance to lower impedance material dominates.

Figure 8B:
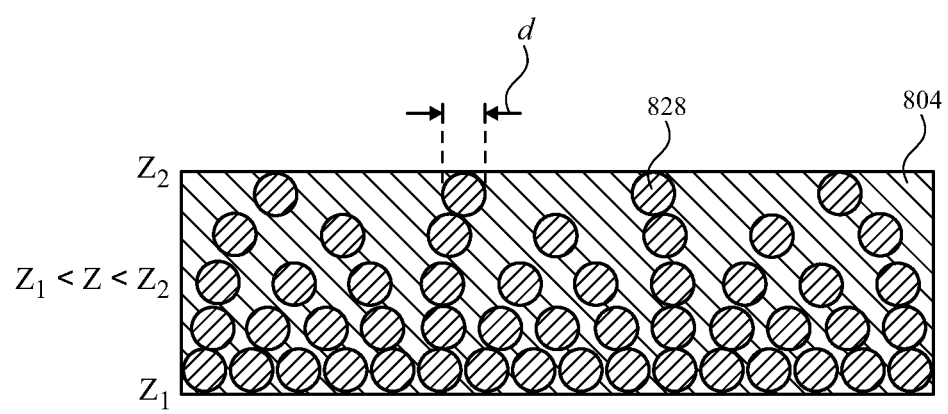
FIG. 8B illustrates a sensing plate having a nonuniform distribution of pores according to examples of the disclosure.

FIG. 8B illustrates sensing plate 804 having a nonuniform distribution of pores 828 according to examples of the disclosure. As shown in the example of FIG. 8B, closed pores 828 can be filled with air, gas, or other low acoustic impedance material, and can have a diameter d selected to be less than the wavelength of the acoustic signal propagating through sensing plate 804 (and in some instances much less, such as less than one-tenth of the wavelength) to minimize ultrasonic wave reflections. In some examples, d can be about 3-10 microns. In some examples, pores 828 can be added to sensing plate 804 using a metal injection molding process wherein a binder material with a volume fraction that varies over time is added to a metal powder as the sensing plate is gradually formed. When sensing plate 804 is fully built up, de-binding and sintering can be performed on the matching layer to remove the binder and create porosity throughout the matching layer. Because the density of pores 828 is greatest at the bottom of sensing plate 804 and lowest at the top, the acoustic impedance can increase gradually throughout the sensing plate from $Z1$ at the bottom to $Z2$ at the top.

Figure 8C:
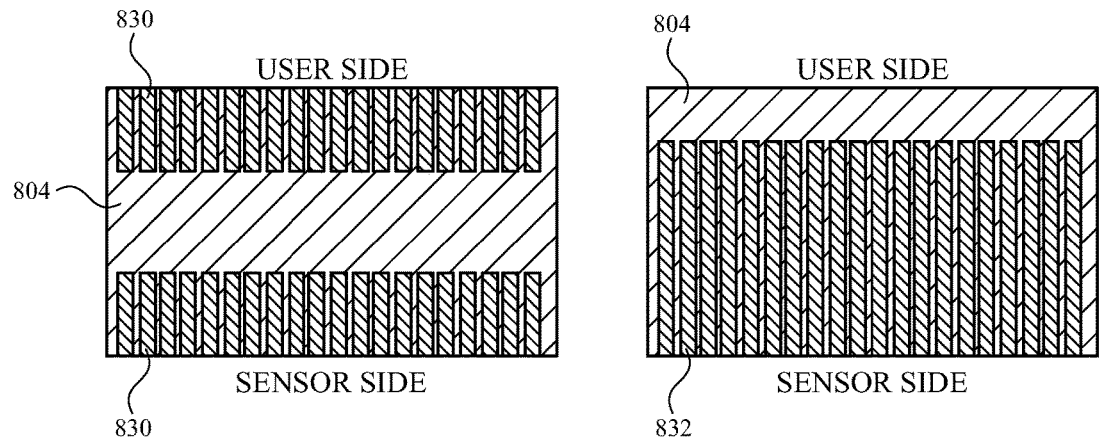
FIG. 8C illustrates a sensing plate having perforations according to examples of the disclosure.

FIG. 8C illustrates sensing plate 804 having pores in the form of perforations, notches or cavities according to examples of the disclosure. In the example left sensing plate 804 of FIG. 8C, laser micro perforations 830 having a depth of 25-30 microns and a pitch of 25 microns can be created in the top surface (the touch surface) and the bottom surface (the surface facing the PMUT array) of the sensing plate, which can be made of SUS or $ZrO_2$. Because perforations 830 do not extend through the entirety of sensing plate 804, a nonuniform distribution of pores is created. In some examples, the open-ended notches or voids created by the laser microperforations can be filled with a low acoustic impedance material. Laser micro perforations 830 on the top surface of sensing plate 804 can have a width and depth selected to lower the acoustic impedance at the top of the sensing plate to more closely match the acoustic impedance of a touching finger, for example, while the laser micro perforations on the bottom surface can have a different width and depth selected to lower the acoustic impedance at the bottom of the sensing plate to more closely match the acoustic impedance of an underlying epoxy layer or PMUT array, for example. In the example right sensing plate 804 of FIG. 8C, deep laser micro perforations 832 having a depth of about 120 microns and a pitch of 50 microns can be created in the bottom surface (the surface facing the PMUT array) of the sensing plate, which can be made of SUS or $ZrO_2$. Because perforations 832 do not extend through the entirety of sensing plate 804, a nonuniform distribution of pores is created. Deep laser micro perforations 832 on the bottom surface can have a width and depth selected to lower the acoustic impedance at the bottom of the sensing plate to more closely match the acoustic impedance of an underlying epoxy layer or PMUT array, for example. In other examples, perforations 830 and 832 in FIG. 8C can be formed by building up material rather than by removing material using a laser.

Figure 8D:
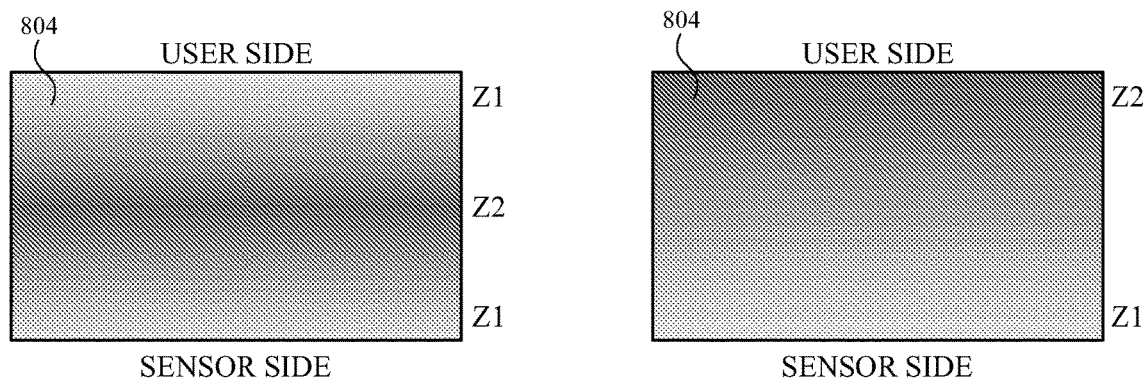
FIG. 8D illustrates a sensing plate having density variations according to examples of the disclosure.

FIG. 8D illustrates sensing plate 804 having density variations according to examples of the disclosure. In the example left sensing plate 804 of FIG. 8D, additive manufacturing techniques (i.e., 3D printing) can be employed to form a nonuniform material density gradient throughout the sensing plate, which can be made of SUS or other materials. The material density at the top surface and the bottom surface can be selected to be lower (i.e. more closed pores or voids) to create a lower acoustic impedance Z1 that more closely matches the acoustic impedance of a touching finger at the top surface, and to more closely match the acoustic impedance of an epoxy or PMUT array below the bottom surface. The material density towards the middle of sensing plate 804 can be selected to be higher (i.e., fewer closed pores or voids) to create a higher acoustic impedance Z2 in that area. In some examples, material density can vary from 50-96%. In the example right sensing plate 804 of FIG. 8D, additive manufacturing techniques (i.e., 3D printing) can be employed to form a nonuniform material density gradient throughout the sensing plate. The material density at the bottom surface can be selected to be lower (i.e. more closed pores or voids) to create a lower acoustic impedance Z1 that more closely matches the acoustic impedance of an epoxy or PMUT array below the bottom surface. The material density at the top surface of sensing plate 804 can be selected to be higher (i.e., fewer closed pores or voids) to create a higher acoustic impedance Z2 in that area.

Figure 8E:
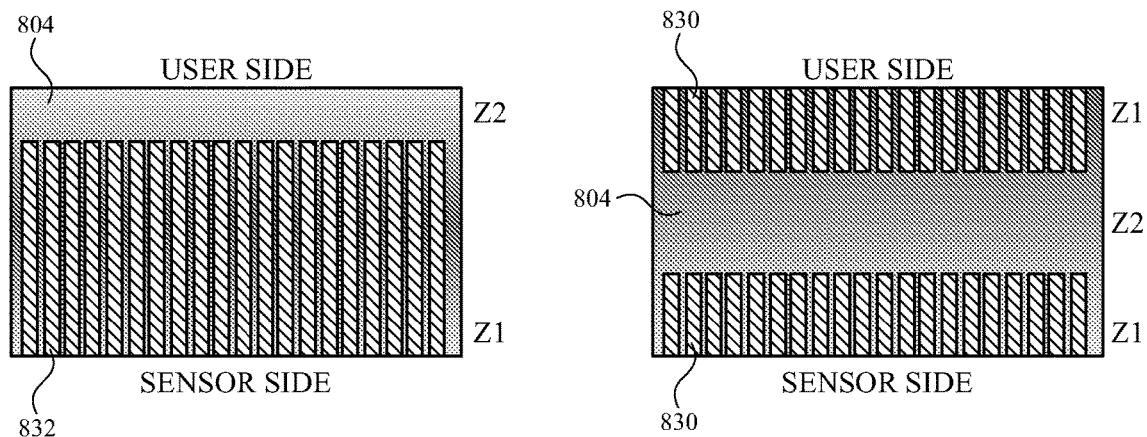
FIG. 8E illustrates a sensing plate having perforations and density variations according to examples of the disclosure.

FIG. 8E illustrates sensing plate 804 having perforations and density variations according to examples of the disclosure. The example left sensing plate 804 of FIG. 8E can be a combination of the right sensing plates of FIGS. 8C and 8D, with deep micro perforations (created by removing or building up material) on the bottom surface and material density variations that vary from low at the bottom surface to high at the top surface. The example right sensing plate 804 of FIG. 8E can be a combination of the left sensing plates of FIGS. 8C and 8D, with micro perforations (created by removing or building up material) on the top and bottom surfaces and material density variations that vary from low at the top and bottom surfaces to high towards the middle.

Although the preceding examples utilized pores and/or perforations to create one or more acoustic impedance transitions (e.g., gradients) with the sensing plate, in other examples of the disclosure geometric structures can alternatively or additionally be utilized to produce these acoustic impedance transitions.

Figure 9A:
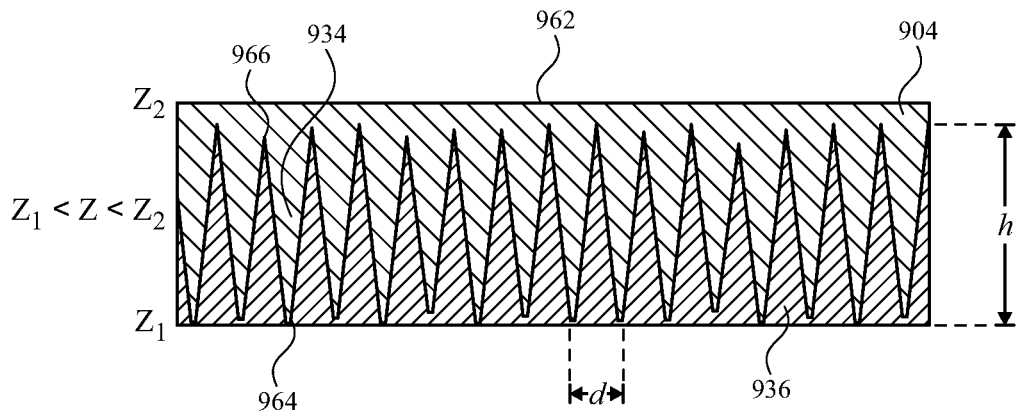
FIG. 9A illustrates a sensing plate having geometric structures for creating an acoustic impedance gradient according to examples of the disclosure.

FIG. 9A illustrates sensing plate 904 having geometric structures 934 for creating an acoustic impedance gradient according to examples of the disclosure. In the example of FIG. 9A, sensing plate 904 can have a top surface for receiving one or more touches and a lower formed with geometric structures 934 (e.g., conical structures) to create a gradual acoustic impedance transition. In some examples, geometric structures 934 can be formed in sensing plates made of SUS or $ZrO_2$. Geometric structures can have distal endpoints 964 and valleys 966. Geometric structures 934 can be created by laser ablation, microindentation, molding, additive manufacturing, etc., and can be aligned in an orthogonal x-y array, offset in a diagonal array, or arranged in other regular or random arrangements. Shapes other than cones, such as pyramids or generally cone-shaped structures with non-linear surfaces can also be used, although in some examples a cone shape may be easier to manufacturing using available micro-fabrication methods. The spaces between geometric structures 934 can then be filled with lower acoustic impedance material 936. Material 936 can be an adhesive layer such as an epoxy or the composite epoxy described above (if the geometric structures directly contact the epoxy layer), a matching layer as described above (if a matching layer is sandwiched between the geometric structures and the epoxy layer), or other material. In essence, lower acoustic impedance filler material 936 together with the higher acoustic impedance geometric structures 934 in sensing plate 904 are "geometrically mixed" to create a gradual acoustic impedance transition at the frequencies of interest.

The width d of each geometric structure 934 (i.e., the distance between two peaks, or between two valleys; the pitch) can be selected to be less than the average wavelength of the ultrasonic wave propagating through material 936 and sensing plate 904 (and in some instances much less, such as less than one-third of the wavelength), to reduce the scattering and reflection of the wave. In some examples, d can be about 30-60 microns. The height h of geometric structure 934 from valleys 966 to distal endpoint 964 can be selected to be large enough to provide a smooth and gradual acoustic impedance transition. In some examples, h can be three times the wavelength of the ultrasonic wave. In some examples, the height can be about 100-300 microns. In other examples, for SUS sensing plates, height h can be about 120 microns, and for $ZrO_2$, the height h can be about 160 microns.

When the width d is selected to be much less than the wavelength of the ultrasonic wave, the acoustic impedance at the boundary of sensing plate 904 (i.e., at the location of geometric structures 934) can be approximated by the average properties of the sensing plate and filler material 936. The average acoustic impedance is roughly proportional to the area fraction of the two materials at any point along a cross section of those materials in a theoretical plane parallel to the top surface of the sensing plate. The acoustic impedance can therefore transition from the acoustic impedance of material 936 to the acoustic impedance of sensing plate 904 as the theoretical plane moves from the distal endpoints to the valleys of geometric structures 934. The geometry (e.g., slope or taper) of geometric structures 934 can determine the rate of change of the acoustic impedance.

Figure 9B:
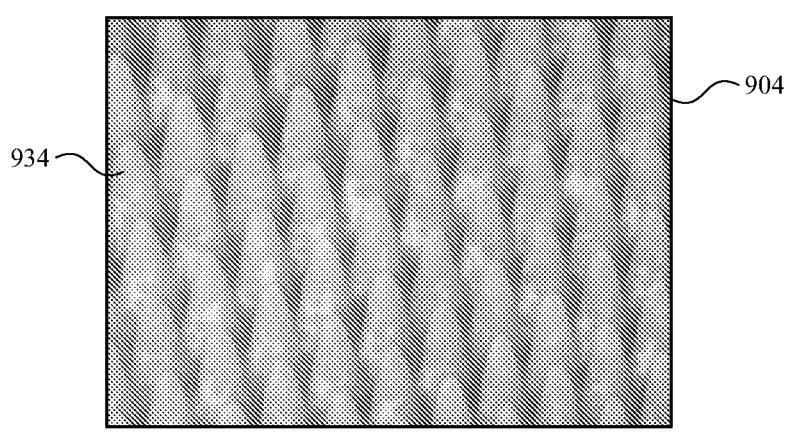
FIG. 9B is a perspective view of a sensing plate with geometric structures according to examples of the disclosure.

FIG. 9B is a perspective view of sensing plate 904 with geometric structures 934 according to examples of the disclosure.

As discussed above, in some examples of the disclosure, material 936 can be a matching layer. FIG. 7C, discussed above, illustrates an example process for creating a SUS sensing plate with geometric structures and an associated tin matching layer.

Figure 9C:
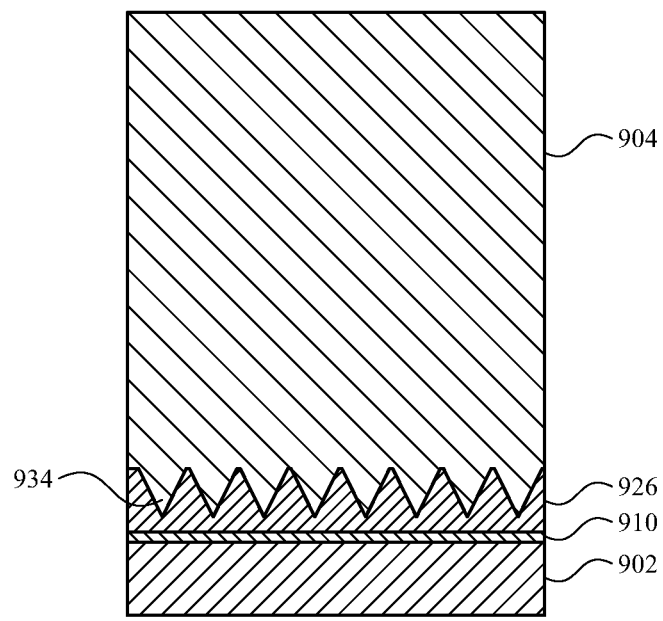
FIG. 9C illustrates a stainless steel (SUS) sensing plate with geometric structures filled with a Tin (Sn) matching layer finished as shown in FIG. 7C, and then adhered to a PMUT array using an epoxy according to examples of the disclosure.

FIG. 9C illustrates a SUS sensing plate with geometric structures 934 filled with a Sn matching layer 926 finished as shown in FIG. 7C, and then adhered to PMUT array 902 using epoxy 910 according to examples of the disclosure.

Referring again to FIG. 4A, PMUT array 402 can generate parasitic ultrasonic waves 448 that can propagate through electronics 408, reflect off the components and back surface of the electronics and return to the PMUT array as parasitic reflections 438. Like parasitic reflections 414, parasitic reflections 438 can adversely affect the ability of PMUT array 402 to perform touch sensing and fingerprint imaging. Accordingly, in some examples of the disclosure, an absorbent can be formed on the back surface of electronics 408 to absorb ultrasonic waves 448 and reduce parasitic reflections 438.

Figure 10A:
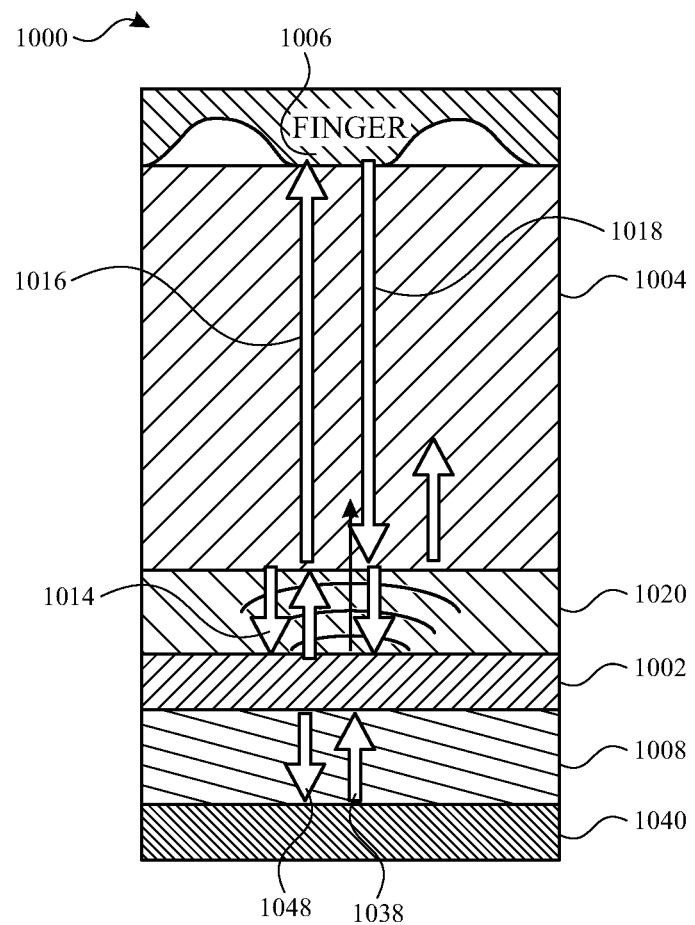
FIG. 10A illustrates a touch sensing and fingerprint imaging stackup using a PMUT array backed with an absorbent according to examples of the disclosure.

FIG. 10A illustrates touch sensing and fingerprint imaging stackup 1000 using PMUT array 1002 backed with absorbent 1040 according to examples of the disclosure. FIG. 10A is similar to FIG. 4A, except for the addition of absorbent 1040 formed on the back surface of electronics 1008. Because PMUT array 1002 will also generate undesired (parasitic) ultrasonic waves 1048 in the opposite direction from sensing plate 1004 and through any underlying electronics 1008, reflections 1038 from those waves can interfere with the proper detection of a touching finger or fingerprint ridge. In some examples, electronics 1008 can be about 190 microns thick, most of which is a silicon wafer. Accordingly, the acoustic impedance of electronics 1008 is uniform and basically the same as the acoustic impedance of a single crystal SiO2 wafer, which is around 22 MRayl.

In the example of FIG. 10A, absorbent 1040 formed on the back side of electronics 1008 can absorb undesired ultrasonic waves 1048 and reduce reflections 1038 of those waves. In optimum examples, absorbent 1040 can be formulated to have an acoustic impedance that matches the acoustic impedance of electronics 1008 (e.g., 22 MRayl). Absorbent 1040 can be formed of a 0-3 epoxy composite made of Tungsten fillers (particle size >5-15 um) and an epoxy (e.g., Epo-tek® 301 epoxy having an acoustic impedance of about 3 MRayl). The base epoxy can be selected to be highly attenuative. Like the composite epoxy described above, absorbent 1040 can have an acoustic impedance that is higher than the acoustic impedance of the epoxy alone, with high absorption. Tungsten can be used as a filler because it has a high acoustic impedance mismatch with the epoxy, which can cause high scattering and increased absorption of energy, although in other examples different filler materials having high acoustic impedance mismatches with the epoxy can also be used. In addition, the high acoustic impedance of Tungsten can result in a high overall acoustic impedance for the epoxy composite, which can make it a better acoustic impedance match with electronics 1008. The diameter of the filler particles can be a quarter wavelength of the ultrasonic waves propagating through absorbent 1040 for maximized scattering.

Figure 10B:
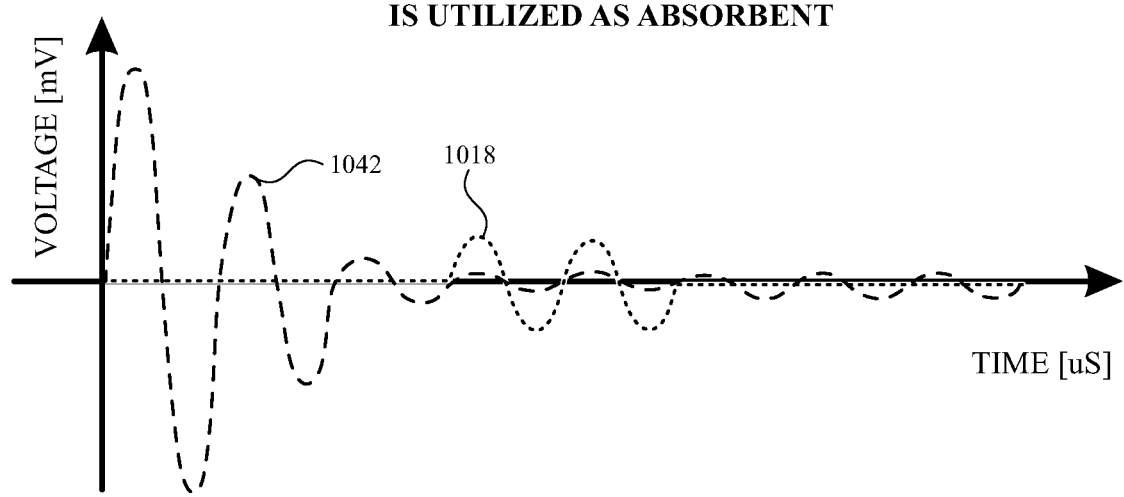
FIG. 10B illustrates parasitic reflections from acoustic impedance mismatches (e.g., a combined effect of reflections) and a finger signature reflected back from the touch surface of a sensing plate when a composite epoxy and an absorbent are utilized according to examples of the disclosure.

FIG. 10B illustrates parasitic reflections 1042 from acoustic impedance mismatches (e.g., a combined effect of reflections 1014 and 1038) and finger signature 1018 reflected back from the touch surface of sensing plate 1004 when composite epoxy 1020 and absorbent 1040 are utilized according to examples of the disclosure. In the example of FIG. 10B, composite epoxy 1020 can reduce the acoustic impedance mismatch between the epoxy and sensing plate 1004, and absorbent 1040 can reduce the reflections received back from electronics 1008. Because less energy from the parasitic reflections is received back at PMUT array 1002, the amplitude (energy) of parasitic reflections 1042 can decrease, while the amplitude of finger signature 1018 can advantageously increase.

Figure 11:
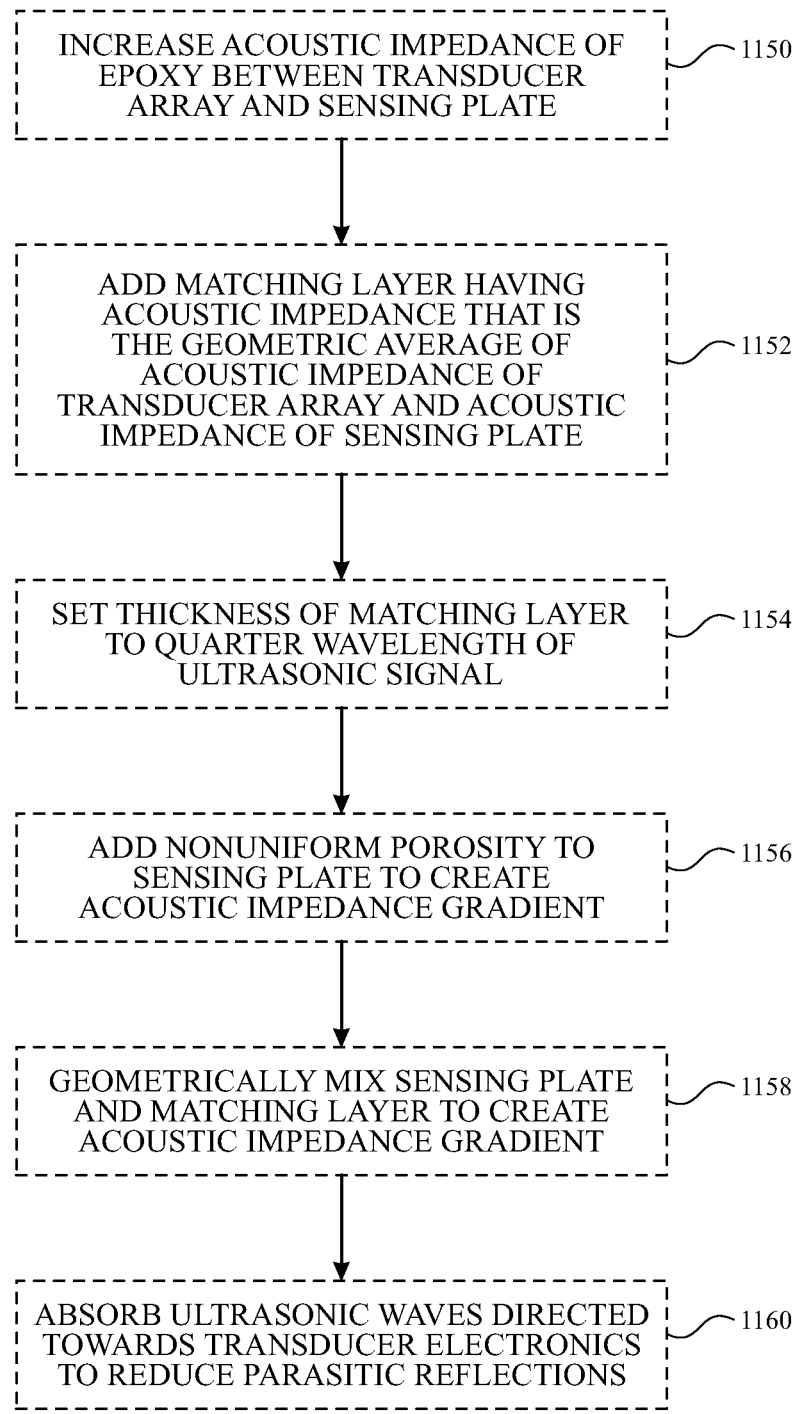
FIG. 11 illustrates a flowchart for acoustic impedance matching and improved touch sensing and fingerprint imaging according to examples of the disclosure.

FIG. 11 illustrates a flowchart for acoustic impedance matching and improved touch sensing and fingerprint imaging according to examples of the disclosure. In the example flowchart of FIG. 11, dashed blocks indicate that any one of these blocks are optional, and that any one or more of these blocks can be performed separately or in combination. It should be understood that although the blocks appear in sequence, that arrangement is only for convenience of illustration, and that any of these blocks can be implemented in any order. At block 1150, the acoustic impedance of the epoxy adhering the transducer array to the sensing plate can be increased to reduce acoustic impedance mismatches between the transducer array and the sensing plate. At block 1152, a matching layer can be added between the transducer array and the sensing plate, with the acoustic impedance of the matching layer being the geometric mean of the acoustic impedance of the transducer array and the sensing plate. At block 1154, the thickness of the matching layer can be set to the quarter wavelength of the ultrasonic signal. At block 1156, nonuniform porosity can be added to the sensing plate to create an acoustic impedance gradient. At block 1158, the sensing plate and the matching layer can be "geometrically mixed" by forming geometric structures on the sensing plate. At block 1160, ultrasonic waves directed to the transducer electronics can be absorbed to reduce parasitic reflections.

Although various examples have been illustrated and described above primarily in separate figures and paragraphs for clarity, it should be understood that various combinations of the described examples can be utilized together according to further examples of the disclosure. For example, combinations of any two or more of the composite epoxy layer, the matching layer, the porosity and/or perforations in the sensing plate, the geometric structures on the sensing plate, and the absorbent layer can also be employed according to examples of the disclosure.

Therefore, according to the above, some examples of the disclosure are directed to a touch sensing device, comprising a sensing plate having a first surface, a second surface and a first acoustic impedance, the first surface configured for receiving one or more touches and the second surface formed with a plurality of geometric structures, and one or more ultrasonic transducers configured for propagating ultrasonic waves through the sensing plate to the first surface, wherein the plurality of geometric structures taper from valleys to distal endpoints oriented towards the one or more ultrasonic transducers, the plurality of geometric structures configured for reducing an acoustic impedance mismatch between the one or more ultrasonic transducers and the sensing plate. Additionally or alternatively to one or more of the examples disclosed above, in some examples a pitch between adjacent distal endpoints of the plurality of geometric structures is less than a wavelength of the ultrasonic waves expected to propagate through the geometric structures when generated by the one or more ultrasonic transducers. Additionally or alternatively to one or more of the examples disclosed above, in some examples the pitch between adjacent distal endpoints is between about 3-10 microns. Additionally or alternatively to one or more of the examples disclosed above, in some examples a height of the plurality of geometric structures from the valleys to the distal endpoints is greater than a wavelength of the ultrasonic waves expected to propagate through the geometric structures when generated by the one or more ultrasonic transducers. Additionally or alternatively to one or more of the examples disclosed above, in some examples the height of the plurality of geometric structures is between about 100-300 microns. Additionally or alternatively to one or more of the examples disclosed above, in some examples the touch sensing device further comprises a filler material disposed between the plurality of geometric structures and the one or more ultrasonic transducers, the filler material having a second acoustic impedance lower than the first acoustic impedance. Additionally or alternatively to one or more of the examples disclosed above, in some examples the plurality of geometric structures and the filler material are configured to produce an average acoustic impedance that transitions from the second acoustic impedance of the filler material at the distal endpoints of the plurality of geometric structures to the first acoustic impedance of the sensing plate at the valleys of the plurality of geometric structures. Additionally or alternatively to one or more of the examples disclosed above, in some examples the filler material is an adhesive layer. Additionally or alternatively to one or more of the examples disclosed above, in some examples the filler material is a matching layer sandwiched between the geometric structures and an adhesive layer, the second acoustic impedance of the matching layer configured to be approximately a geometric mean of the first acoustic impedance of the sensing pate and a third acoustic impedance of the adhesive layer. Additionally or alternatively to one or more of the examples disclosed above, in some examples the adhesive layer is a composite adhesive layer formed from particles suspended in an epoxy having a fourth acoustic impedance, the composite epoxy having the third acoustic impedance greater than the fourth acoustic impedance. Additionally or alternatively to one or more of the examples disclosed above, in some examples the filler material is a matching layer sandwiched between the plurality of geometric structures and the one or more ultrasonic transducers, the second acoustic impedance of the matching layer configured to be approximately a geometric mean of the acoustic impedance of the sensing pate and the acoustic impedance of the one or more ultrasonic transducers. Additionally or alternatively to one or more of the examples disclosed above, in some examples one or more of the plurality of geometric structures comprise a cone-shaped structure. Additionally or alternatively to one or more of the examples disclosed above, in some examples a taper of the cone-shaped structure is configured to produce a predetermined transition rate from the second acoustic impedance of the filler material to the first acoustic impedance of the sensing plate.

Some examples of the disclosure are directed to a method for reducing an acoustic impedance mismatch between one or more ultrasonic transducers and a sensing plate of a touch sensing device having a first acoustic impedance, the method comprising forming a plurality of geometric structures on a second surface of the sensing plate facing the one or more ultrasonic transducers, tapering the plurality of geometric structures from valleys to distal endpoints oriented towards the one or more ultrasonic transducers, and transitioning an acoustic impedance encountered by acoustic waves generated by the one or more ultrasonic transducers from a second acoustic impedance less than the first acoustic impedance at the distal endpoints of the plurality of geometric structures to the first acoustic impedance at the valleys of the plurality of geometric structures. Additionally or alternatively to one or more of the examples disclosed above, in some examples the method further comprises forming the plurality of geometric structures with a pitch between adjacent distal endpoints less than a wavelength of the ultrasonic waves expected to propagate through the geometric structures when generated by the one or more ultrasonic transducers. Additionally or alternatively to one or more of the examples disclosed above, in some examples the method further comprises forming the plurality of geometric structures with a height between the valleys and the distal endpoints greater than a wavelength of the ultrasonic waves expected to propagate through the geometric structures when generated by the one or more ultrasonic transducers. Additionally or alternatively to one or more of the examples disclosed above, in some examples the method further comprises disposing a filler material between the plurality of geometric structures and the one or more ultrasonic transducers, the filler material having a second acoustic impedance lower than the first acoustic impedance. Additionally or alternatively to one or more of the examples disclosed above, in some examples the method further comprises producing an average acoustic impedance from the distal endpoints to the valleys of the plurality of geometric structures that transitions from the acoustic impedance of the filler material to the acoustic impedance of the sensing plate. Additionally or alternatively to one or more of the examples disclosed above, in some examples the method further comprises adhering the sensing plate to the one or more ultrasonic transducers using the filling material as an adhesive. Additionally or alternatively to one or more of the examples disclosed above, in some examples the method further comprises formulating the filler material as a matching layer having an acoustic impedance that is approximately a geometric mean of the first acoustic impedance of the sensing pate and an acoustic impedance of an adhesive layer.

Some examples of the disclosure are directed to a touch sensing device, comprising a sensing plate having a first surface, a second surface and a first acoustic impedance, the first surface configured for receiving one or more touches, one or more ultrasonic transducers configured for propagating ultrasonic waves through the sensing plate to the first surface, and a nonuniform distribution of a plurality of pores within the sensing plate, the plurality of pores configured for creating an acoustic impedance gradient within the sensing plate and reducing an acoustic impedance mismatch between the one or more ultrasonic transducers and the sensing plate. Additionally or alternatively to one or more of the examples disclosed above, in some examples the plurality of pores comprise a plurality of enclosed voids having a second acoustic impedance lower than the first acoustic impedance. Additionally or alternatively to one or more of the examples disclosed above, in some examples a diameter of the plurality of pores is less than a wavelength of the ultrasonic waves expected to propagate through the sensing plate when generated by the one or more ultrasonic transducers. Additionally or alternatively to one or more of the examples disclosed above, in some examples the diameter of the plurality of pores is between about 30-60 microns.

Additionally or alternatively to one or more of the examples disclosed above, in some examples the second surface of the sensing plate is closest to the one or more ultrasonic transducers, and the sensing plate includes a greater distribution of pores near the second surface as compared to the distribution of pores near the first surface to create an acoustic impedance gradient across the sensing plate. Additionally or alternatively to one or more of the examples disclosed above, in some examples the plurality of pores comprise a plurality of open-ended perforations extending partially into the sensing plate, the plurality of open-ended perforations resulting a second acoustic impedance at the sensing plate at a location of the plurality of open-ended perforations that is lower than the first acoustic impedance. Additionally or alternatively to one or more of the examples disclosed above, in some examples the second surface of the sensing plate is closest to the one or more ultrasonic transducers, the second surface including the plurality of open-ended perforations. Additionally or alternatively to one or more of the examples disclosed above, in some examples the plurality of open-ended perforations on the second surface have a width and depth configured such that the second acoustic impedance of the sensing plate near the second surface more closely matches a third acoustic impedance of a layer underlying the sensing plate. Additionally or alternatively to one or more of the examples disclosed above, in some examples the first surface also includes the plurality of open-ended perforations. Additionally or alternatively to one or more of the examples disclosed above, in some examples the plurality of open-ended perforations on the first surface have a width and depth configured such that the acoustic impedance of the sensing plate near the first surface more closely matches an acoustic impedance of an object in contact with the first surface. Additionally or alternatively to one or more of the examples disclosed above, in some examples the second surface of the sensing plate is closest to the one or more ultrasonic transducers, the sensing plate including a greater distribution of pores near the first surface and near the second surface as compared to the distribution of pores near a center of the sensing plate to create an acoustic impedance gradient across the sensing plate. Additionally or alternatively to one or more of the examples disclosed above, in some examples the sensing plate is configured with a nonuniform material density gradient such that the highest material density is near the center of the sensing plate.

Some examples of the disclosure are directed to a method for reducing an acoustic impedance mismatch between one or more ultrasonic transducers and a sensing plate in a touch sensing device, the sensing plate having first and second surfaces and a first acoustic impedance, the method comprising forming a plurality of pores within the sensing plate, and arranging the plurality of pores in a nonuniform distribution to create an acoustic impedance gradient within the sensing plate, wherein the acoustic impedance gradient produces a second acoustic impedance near the second surface of the sensing plate closest to the one or more ultrasonic transducers that is less than the first acoustic impedance. Additionally or alternatively to one or more of the examples disclosed above, in some examples the method further comprises forming the plurality of pores as a plurality of enclosed voids having a third acoustic impedance lower than the first acoustic impedance. Additionally or alternatively to one or more of the examples disclosed above, in some examples the method further comprises forming the plurality of pores with a diameter less than a wavelength of the ultrasonic waves expected to propagate through the sensing plate when generated by the one or more ultrasonic transducers. Additionally or alternatively to one or more of the examples disclosed above, in some examples the method further comprises arranging the plurality of pores in the nonuniform distribution with a greater distribution of pores near the second surface as compared to the distribution of pores near the first surface to create the acoustic impedance gradient across the sensing plate. Additionally or alternatively to one or more of the examples disclosed above, in some examples the method further comprises forming the plurality of pores as a plurality of open-ended perforations extending partially into the sensing plate. Additionally or alternatively to one or more of the examples disclosed above, in some examples the method further comprises forming the plurality of open-ended perforations on the second surface of the sensing plate. Additionally or alternatively to one or more of the examples disclosed above, in some examples the method further comprises forming the plurality of open-ended perforations on the first surface of the sensing plate. Additionally or alternatively to one or more of the examples disclosed above, in some examples the method further comprises forming a greater distribution of pores near the first surface and near the second surface as compared to the distribution of pores near a center of the sensing plate to create an acoustic impedance gradient across the sensing plate.

Some examples of the disclosure are directed to a touch sensing device, comprising a metallic sensing plate having a first surface, a second surface and a first acoustic impedance, the first surface configured for receiving one or more touches, one or more ultrasonic transducers having a third acoustic impedance and configured for propagating ultrasonic waves through the sensing plate to the first surface, and a matching layer disposed between the one or more ultrasonic transducers and the sensing plate, wherein the matching layer is configured to have a second acoustic impedance that is approximately a geometric mean of the first acoustic impedance and the third acoustic impedance for creating an acoustic impedance gradient between the one or more ultrasonic transducers and the sensing plate and reducing an acoustic impedance mismatch between the one or more ultrasonic transducers and the sensing plate. Additionally or alternatively to one or more of the examples disclosed above, in some examples a thickness of the matching layer is about a quarter wavelength of the ultrasonic waves expected to propagate through the matching layer when generated by the one or more ultrasonic transducers. Additionally or alternatively to one or more of the examples disclosed above, in some examples the metallic sensing plate is made of stainless steel and the matching layer is made of tin. Additionally or alternatively to one or more of the examples disclosed above, in some examples the touch sensing device further comprises a layer of nickel of a thickness less than 5 microns formed between the metallic sensing plate and the matching layer. Additionally or alternatively to one or more of the examples disclosed above, in some examples the matching layer includes a plurality of matching sub-layers formed from a plurality of materials, each sub-layer having an increasing ultrasonic impedance from a bottom sub-layer to a top sub-layer adjacent to the metallic sensing plate. Additionally or alternatively to one or more of the examples disclosed above, in some examples the matching layer includes a plurality of matching sub-layers formed from a plurality of materials, each sub-layer having an acoustic impedance that is approximately a geometric mean of the acoustic impedance of material on either side of the sub-layer. Additionally or alternatively to one or more of the examples disclosed above, in some examples the matching layer includes a plurality of matching sub-layers formed from a plurality of materials, all matching sub-layers having a total thickness about a quarter wavelength of the ultrasonic waves expected to propagate through the matching sub-layers when generated by the one or more ultrasonic transducers. Additionally or alternatively to one or more of the examples disclosed above, in some examples at least one matching sub-layer is formed from a combination of the plurality of materials in a particular ratio. Additionally or alternatively to one or more of the examples disclosed above, in some examples the matching layer includes a plurality of matching sub-layers, each sub-layer having a thickness about a quarter wavelength of the ultrasonic waves expected to propagate through that sub-layer when generated by the one or more ultrasonic transducers.

Some examples of the disclosure are directed to a method for reducing an acoustic impedance mismatch between one or more ultrasonic transducers having a third acoustic impedance and a metallic sensing plate having a first acoustic impedance in a touch sensing device, the method comprising disposing a matching layer between the one or more ultrasonic transducers and the metallic sensing plate, and selecting the matching layer to have a second acoustic impedance that is approximately a geometric mean of the first acoustic impedance and the third acoustic impedance to create an acoustic impedance gradient between the one or more ultrasonic transducers and the sensing plate and reduce an acoustic impedance mismatch between the one or more ultrasonic transducers and the sensing plate. Additionally or alternatively to one or more of the examples disclosed above, in some examples the method further comprises selecting a thickness of the matching layer to be about a quarter wavelength of the ultrasonic waves expected to propagate through the matching layer when generated by the one or more ultrasonic transducers. Additionally or alternatively to one or more of the examples disclosed above, in some examples the method further comprises disposing a seed layer between the metallic sensing plate and the matching layer. Additionally or alternatively to one or more of the examples disclosed above, in some examples the method further comprises creating the matching layer from a plurality of matching sub-layers formed from a plurality of materials, each sub-layer having an increasing ultrasonic impedance from the bottom sub-layer to the top sub-layer adjacent to the metallic sensing plate. Additionally or alternatively to one or more of the examples disclosed above, in some examples the method further comprises creating the matching layer from a plurality of matching sub-layers formed from a plurality of materials, each sub-layer having an acoustic impedance that is approximately a geometric mean of the acoustic impedance of material on either side of the sub-layer. Additionally or alternatively to one or more of the examples disclosed above, in some examples the method further comprises creating the matching layer from a plurality of matching sub-layers formed from a plurality of materials, all matching sub-layers having a total thickness about a quarter wavelength of the ultrasonic waves expected to propagate through the matching sub-layers when generated by the one or more ultrasonic transducers. Additionally or alternatively to one or more of the examples disclosed above, in some examples the method further comprises creating at least one matching sub-layer from a combination of the plurality of materials in a particular ratio. Additionally or alternatively to one or more of the examples disclosed above, in some examples the method further comprises applying the combination of the plurality of materials in the particular ratio using physical vapor deposition. Additionally or alternatively to one or more of the examples disclosed above, in some examples the method further comprises creating the matching layer from a plurality of matching sub-layers, each sub-layer having a thickness about a quarter wavelength of the ultrasonic waves expected to propagate through that sub-layer when generated by the one or more ultrasonic transducers. Additionally or alternatively to one or more of the examples disclosed above, in some examples the method further comprises forming the matching layer using one or more of plating, cladding, and physical vapor deposition (PVD).

Although examples of this disclosure have been fully described with reference to the accompanying drawings, it is to be noted that various changes and modifications will become apparent to those skilled in the art. Such changes and modifications are to be understood as being included within the scope of examples of this disclosure as defined by the appended claims.

What is claimed is:

1. A touch sensing device, comprising:
   a sensing plate having a first surface, a second surface and a first acoustic impedance, the first surface configured for receiving one or more touches;
   one or more ultrasonic transducers configured for propagating ultrasonic waves through the sensing plate to the first surface; and
   a nonuniform distribution of a plurality of closed pores within the sensing plate, the plurality of closed pores configured for creating an acoustic impedance gradient within the sensing plate and reducing an acoustic impedance mismatch between the one or more ultrasonic transducers and the sensing plate wherein:
      the second surface of the sensing plate is closest to the one or more ultrasonic transducers, the sensing plate including a greater distribution of closed pores near the first surface and near the second surface as compared to a distribution of pores near a center of the sensing plate to create an acoustic impedance gradient across the sensing plate.

2. The touch sensing device of claim 1, wherein the plurality of closed pores comprises a plurality of enclosed voids having a second acoustic impedance lower than the first acoustic impedance.

3. The touch sensing device of claim 1, wherein a diameter of the plurality of closed pores is less than a wavelength of the ultrasonic waves expected to propagate through the sensing plate when generated by the one or more ultrasonic transducers.

4. The touch sensing device of claim 3, wherein the diameter of the plurality of closed pores is between about 3-10 microns.

5. The touch sensing device of claim 2, wherein the second surface of the sensing plate is closest to the one or more ultrasonic transducers, and the sensing plate includes a greater distribution of closed pores near the second surface as compared to a distribution of closed pores near the first surface to create an acoustic impedance gradient across the sensing plate.

6. A touch sensing device comprising:
   a sensing plate having a first surface, a second surface and a first acoustic impedance, the first surface configured for receiving one or more touches;
   one or more ultrasonic transducers configured for propagating ultrasonic waves through the sensing plate to the first surface; and a nonuniform distribution of a plurality of pores within the sensing plate, the plurality of pores configured for creating an acoustic impedance gradient within the sensing plate and reducing an acoustic impedance mismatch between the one or more ultrasonic transducers and the sensing plate, wherein:

the plurality of pores comprises a plurality of open-ended perforations extending partially into the sensing plate, the plurality of open-ended perforations resulting a second acoustic impedance at the sensing plate at a location of the plurality of open-ended perforations that is lower than the first acoustic impedance.

7. The touch sensing device of claim 6, wherein the second surface of the sensing plate is closest to the one or more ultrasonic transducers, the second surface including the plurality of open-ended perforations.

8. The touch sensing device of claim 7, the plurality of open-ended perforations on the second surface having a width and depth configured such that the second acoustic impedance of the sensing plate near the second surface more closely matches a third acoustic impedance of a layer underlying the sensing plate.

9. The touch sensing device of claim 7, the first surface also including the plurality of open-ended perforations.

10. The touch sensing device of claim 9, the plurality of open-ended perforations on the first surface having a width and depth configured such that the first acoustic impedance of the sensing plate near the first surface more closely matches an acoustic impedance of an object in contact with the first surface.

11. The touch sensing device of claim 1, the sensing plate configured with a nonuniform material density gradient such that the highest material density is near the center of the sensing plate.

12. A touch sensing device, comprising:

a sensing plate having a first surface, a second surface and a first acoustic impedance, the first surface configured for receiving one or more touches, wherein:

the second surface of the sensing plate is closest to one or more ultrasonic transducers; and the sensing plate includes a greater distribution of pores near the second surface as compared to a distribution of pores near the first surface to create an acoustic impedance gradient across the sensing plate;

one or more ultrasonic transducers configured for propagating ultrasonic waves through the sensing plate to the first surface; and a nonuniform distribution of a plurality of pores within the sensing plate, the plurality of pores configured for creating an acoustic impedance gradient within the sensing plate and reducing an acoustic impedance mismatch between the one or more ultrasonic transducers and the sensing plate.

13. The touch sensing device of claim 12, wherein the plurality of pores comprises a plurality of enclosed voids having a second acoustic impedance lower than the first acoustic impedance.

14. The touch sensing device of claim 12, wherein a diameter of the plurality of pores is less than a wavelength of the ultrasonic waves expected to propagate through the sensing plate when generated by the one or more ultrasonic transducers.

15. The touch sensing device of claim 14, wherein the diameter of the plurality of pores is between about 3-10 microns.

16. The touch sensing device of claim 12, wherein the plurality of pores comprises a plurality of open-ended perforations extending partially into the sensing plate, the plurality of open-ended perforations resulting a second acoustic impedance at the sensing plate at a location of the plurality of open-ended perforations that is lower than the first acoustic impedance.

17. The touch sensing device of claim 16, wherein the second surface of the sensing plate is closest to the one or more ultrasonic transducers, the second surface including the plurality of open-ended perforations.

18. The touch sensing device of claim 17, the plurality of open-ended perforations on the second surface having a width and depth configured such that the second acoustic impedance of the sensing plate near the second surface more closely matches a third acoustic impedance of a layer underlying the sensing plate.

19. The touch sensing device of claim 17, the first surface also including the plurality of open-ended perforations.

\* \* \* \* \*